(12) United States Patent
Kanemitsu et al.

(10) Patent No.: US 12,069,783 B2
(45) Date of Patent: Aug. 20, 2024

(54) LED DRIVING DEVICE, LIGHTING DEVICE, AND VEHICLE-MOUNTED DISPLAY DEVICE

(71) Applicant: Rohm Co., Ltd., Kyoto (JP)

(72) Inventors: Ryosuke Kanemitsu, Kyoto (JP); Koji Katsura, Kyoto (JP)

(73) Assignee: Rohm Co., Ltd.

( * ) Notice: Subject to any disclaimer, the term of this patent is extended or adjusted under 35 U.S.C. 154(b) by 0 days.

(21) Appl. No.: 18/303,871

(22) Filed: Apr. 20, 2023

(65) Prior Publication Data

US 2023/0254957 A1    Aug. 10, 2023

Related U.S. Application Data

(63) Continuation of application No. 17/851,369, filed on Jun. 28, 2022, now Pat. No. 11,672,063, which is a
(Continued)

(30) Foreign Application Priority Data

Sep. 11, 2018  (JP) .................................. 2018169705

(51) Int. Cl.
*H05B 45/30* (2020.01)
*B60Q 3/18* (2017.01)
(Continued)

(52) U.S. Cl.
CPC ............ *H05B 45/3725* (2020.01); *B60Q 3/18* (2017.02); *H05B 45/10* (2020.01); *H05B 45/325* (2020.01); *H05B 45/345* (2020.01); *H05B 45/56* (2020.01)

(58) Field of Classification Search
CPC ........ H05B 45/10; H05B 45/14; H05B 45/30; H05B 45/46; H05B 45/56; H05B 45/325; H05B 45/345; H05B 45/3725
See application file for complete search history.

(56) References Cited

U.S. PATENT DOCUMENTS 7,265,504 B2   9/2007  Grant
8,390,262 B2   3/2013  Chang et al.
(Continued)

FOREIGN PATENT DOCUMENTS

JP     2010161264    7/2010
JP     2013021117    1/2013
(Continued)

OTHER PUBLICATIONS

Japan Patent Office, International Search Report for PCT/JP2019/006482, dated Apr. 16, 2019, with English translation.

*Primary Examiner* — Tung X Le
(74) *Attorney, Agent, or Firm* — Fish & Richardson P.C.

(57) ABSTRACT

This LED driving device comprises: a DC/DC controller which controls an output stage for supplying an output voltage to an LED; and a current driver which generates an output current of the LED, wherein the current driver performs PWM dimming by turning on the output current in accordance with an LED-current-on period of a PWM dimming signal and turning off the output current in accordance with an LED-current-off period of the PWM dimming signal, and the DC/DC controller includes a feedback control unit which performs feedback control for outputting a switching pulse to the output stage so as to make a cathode voltage of the LED equal to a reference voltage, and a pulse addition control unit which performs pulse addition control for adding a predetermined pulse number of additional switching pulses at a time of switching between the LED-current-on period and the LED-current-off period.

17 Claims, 15 Drawing Sheets

Related U.S. Application Data continuation of application No. 17/274,669, filed as application No. PCT/JP2019/006482 on Feb. 21, 2019, now Pat. No. 11,412,594.

(51) Int. Cl.
*H05B 45/10* (2020.01)
*H05B 45/325* (2020.01)
*H05B 45/345* (2020.01)
*H05B 45/3725* (2020.01)
*H05B 45/56* (2020.01)

(56) References Cited

U.S. PATENT DOCUMENTS

| | | |
|---|---|---|
| 2005/0140315 A1 | 6/2005 | Baldwin et al. |
| 2008/0136770 A1 | 6/2008 | Peker et al. |
| 2010/0026208 A1 | 2/2010 | Shteynberg et al. |
| 2010/0177127 A1* | 7/2010 | Akiyama ............... G09G 3/36 345/102 |
| 2010/0327835 A1 | 12/2010 | Archibald |
| 2011/0084734 A1 | 4/2011 | Russell et al. |
| 2012/0043912 A1* | 2/2012 | Huynh ............... H05B 45/46 315/297 |
| 2012/0049741 A1 | 3/2012 | Ye et al. |
| 2012/0104964 A1 | 5/2012 | Hughes |
| 2012/0181931 A1* | 7/2012 | Katsura ............. G01R 31/2635 315/77 |
| 2013/0009557 A1 | 1/2013 | Szczeszynski |
| 2013/0016310 A1 | 1/2013 | Kanemitsu et al. |
| 2014/0049173 A1 | 2/2014 | Le |
| 2014/0062319 A1* | 3/2014 | Huang ................ H05B 45/375 315/186 |
| 2014/0232547 A1 | 8/2014 | Kanemitsu et al. |
| 2016/0128150 A1 | 5/2016 | Ruan et al. |
| 2016/0302269 A1 | 10/2016 | Kanemitsu et al. |
| 2016/0353533 A1* | 12/2016 | Gyoten ................ H05B 45/10 |
| 2017/0101052 A1 | 4/2017 | Nagao et al. |
| 2017/0249884 A1 | 8/2017 | Kanemitsu et al. |
| 2018/0159434 A1 | 6/2018 | Werner et al. |
| 2019/0115290 A1* | 4/2019 | Okuda ................... H01L 21/76 |
| 2019/0239300 A1* | 8/2019 | Yamada ............. G03B 21/2033 |
| 2021/0274616 A1 | 10/2021 | Kanemitsu et al. |
| 2022/0330403 A1 | 10/2022 | Kanemitsu et al. |

FOREIGN PATENT DOCUMENTS

| | | |
|---|---|---|
| JP | 2015060822 | 3/2015 |
| JP | 2017073492 | 4/2017 |

\* cited by examiner

| R11 | R12 | Number of added pulses |
|---|---|---|
| 20kΩ | 180kΩ | 0 |
| 40kΩ | 90kΩ | 4 |
| 100kΩ | 100kΩ | 8 |
| 90kΩ | 40kΩ | 12 |
| 180kΩ | 20kΩ | 16 |

LED DRIVING DEVICE, LIGHTING DEVICE, AND VEHICLE-MOUNTED DISPLAY DEVICE

CROSS-REFERENCE TO RELATED APPLICATIONS

This application is a continuation of U.S. application Ser. No. 17/851,369, filed Jun. 28, 2022, which is a continuation of U.S. application Ser. No. 17/274,669, filed Mar. 9, 2021, now U.S. Pat. No. 11,412,954, which is a U.S. National Phase application under 35 U.S.C. § 371 of International Patent Application No. PCT/JP2019/006482, filed on Feb. 21, 2019, which claims the priority of Japan Patent Application No. 2018-169705, filed on Sep. 11, 2018, the disclosure of which is incorporated herein by reference in its entirety.

TECHNICAL FIELD

The present invention relates to an LED driving device.

BACKGROUND ART

Conventionally, LEDs (light emitting diodes), with their low power consumption combined with long lives, are applied in a variety of applications. A conventional example of an LED driving device that drives LEDs are disclosed in Patent Document 1.

The LED driving device disclosed in Patent Document 1 includes a DC-DC controller for controlling an output stage that generates from an input voltage an output voltage to feed it to LEDs and a constant current driver for generating an output current passing through LEDs, and drives LEDs constituting a plurality of channels.

The DC-DC controller includes an error amplifier which compares with a reference voltage the lowest among the LED cathode voltages in the plurality of channels, and a PWM comparator which compares the output from the error amplifier with a slope signal to generate an internal PWM signal.

The constant current driver is turned on and off based on an external PWM signal fed in via a PWM terminal. PWM dimming control is thus performed. During the on-period of the constant current driver, the error amplifier and the PWM comparator so operate that the switching element in the output stage is PWM-driven by switching pulses such that the lowest among the cathode voltages equals the reference voltage. In this way, the output voltage (the anode voltage of the LEDs) is controlled to remain at a voltage value that equals the sum of the reference voltage and the maximum voltage among the forward voltages of the LEDs constituting the plurality of channels.

LIST OF CITATIONS

Patent Literature

Patent Document 1: Japanese Unexamined Patent Application published as No. 2013-21117

SUMMARY OF THE INVENTION

Problem to be Solved by the Invention

However, when the on-duty of PWM dimming control is very low, the period in which the constant current driver is on is so short that, due to an insufficient number of switching pulses, the output voltage drops every on-period of the constant current driver. This destabilizes the current passing through the LEDs, possibly preventing proper lighting of the LEDs. Thus, inconveniently, PWM dimming control can only cope with a narrow range of on-duties and cannot achieve a high dimming factor.

In particular in recent years, for example in vehicle-mounted display devices, there is demand for higher LED dimming factors to cope with large variation of the brightness of ambient light.

Against the background discussed above, the present invention is aimed at providing an LED driving device that can achieve higher dimming factors in PWM dimming.

Means for Solving the Problem

According to one aspect of the present invention, an LED driving device includes: a DC-DC controller which controls an output stage for generating from an input voltage an output voltage to feed it to LEDs; and a current driver which generates an output current for the LEDs. The current driver performs PWM dimming by keeping the output current on in accordance with an LED-current-on period of a PWM dimming signal and keeping the output current off in accordance with an LED-current-off period of the PWM dimming signal. The DC-DC controller includes a feedback controller that performs feedback control in which switching pulses are fed to the output stage so that the cathode voltage of the LED equals a reference voltage; and a pulse addition controller that performs pulse addition control in which a predetermined number of additional switching pulses are added on transition between the LED-current-on period and the LED-current-off period. The predetermined number is variably set.

Advantageous Effects of the Invention

With an LED driving device according to the present invention, it is possible to achieve a higher dimming factor in PWM dimming.

DESCRIPTION OF EMBODIMENTS

Embodiment of the present invention will be described below with reference to the accompanying drawings. Note that any specific signal values, temperature values, and the like referred to in the description below are merely examples.

<1. Configuration of an LED Driving Device>

Figure 1:
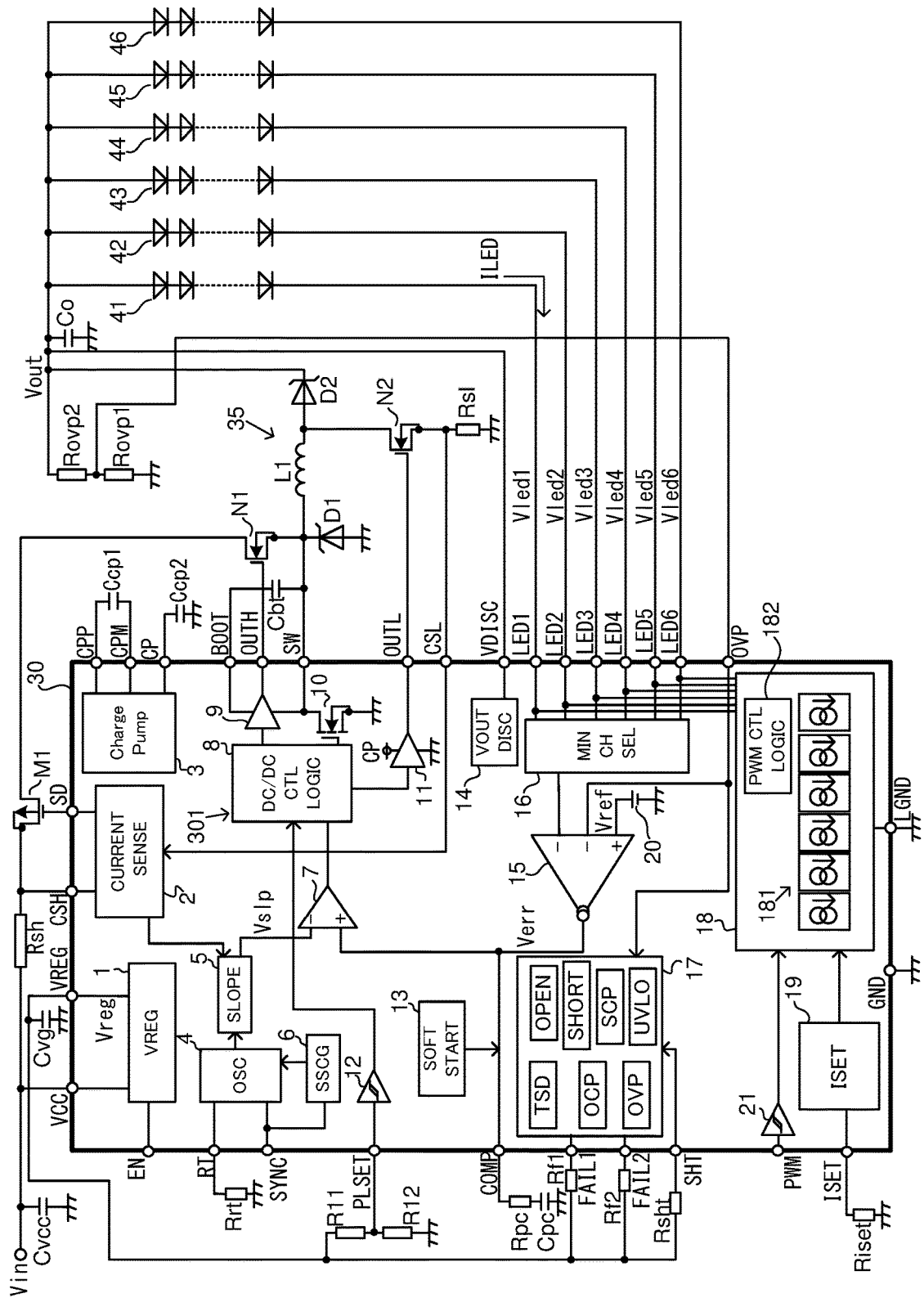
FIG. 1 A circuit configuration diagram showing a configuration of an LED driving device according to one embodiment of the present invention.

FIG. 1 is a circuit configuration diagram showing a configuration of an LED driving device 30 according to one embodiment of the present invention. The LED driving device 30 shown in FIG. 1 drives LED arrays 41 to 46 constituting a plurality of (six in this embodiment) of channels respectively. The LED driving device 30 is a semiconductor device having integrated in it an internal voltage generator 1, a current sensor 2, a charge pump 3, an oscillator 4, a slope generator 5, a spectrum spreader 6, a PWM comparator 7, a control logic circuit 8, a high-side driver 9, a transistor 10, a low-side driver 11, a Schmitt trigger 12, a soft starter 13, an output discharger 14, an error amplifier 15, a selector 16, a protection circuit 17, a constant current driver 18, an LED current setter 19, a reference voltage source 20, and a Schmitt trigger 21.

The LED driving device 30 also includes, as external terminals for establishing electrical connection with the outside, a VCC terminal, a VREG terminal, a CSH terminal, an SD terminal, a CPP terminal, a CPM terminal, a CP terminal, a BOOT terminal, an OUTH terminal, an SW terminal, an OUTL terminal, a CSL terminal, a VDISC terminal, LED1 to LED6 terminals, a PGND terminal, an OVP terminal, an LGND terminal, a GND terminal, an ISET terminal, a PWM terminal, an SHT terminal, a FAIL1 terminal, a FAIL2 terminal, a COMP terminal, a PLSET terminal, an SYNC terminal, an RT terminal, and an EN terminal.

Outside the LED driving device 30, an output stage 35 is arranged for generating an output voltage Vout from an input voltage Vin by DC-DC conversion to feed the output voltage Vout to the LED arrays 41 to 46. The output stage 35 includes a capacitor Cvcc, a resistor Rsh, a switching element N1, a diode D1, an inductor L1, a diode D2, a switching element N2, an output capacitor Co, and a capacitor Cbt. The switching elements N1 and N2 are driven and controlled by the LED driving device 30, and thereby the output stage 35 is controlled by the LED driving device 30. The output stage 35 and the LED driving device 30 constitute a DC-DC converter. This embodiment is configured as, among different types of DC-DC converters, a boost/buck (step-up/down) DC-DC converter.

An application terminal for the input voltage Vin is connected to one end of the capacitor Cvcc. The other end of the capacitor Cvcc is connected to a grounded terminal. The application terminal for the input voltage Vin is connected to one end of the resistor Rsh. The other end of the resistor Rsh is connected to the source of a transistor M1, which is configured as a p-channel MOSFET. The drain of the transistor M1 is connected to the drain of the switching element N1, which is configured as an n-channel MOSFET. The source of the switching element N1 is connected to the cathode of the diode D1. The anode of the diode D1 is connected to the grounded terminal. The gate of the switching element N1 is connected to the OUTH terminal.

To the node at which the switching element N1 and the diode D1 are connected together, one end of the inductor L1 is connected. The other end of the inductor L1 is connected to the anode of the diode D2 and also to the drain of the switching element N2, which is configured as an n-channel MOSFET. The source of the switching element N2 is connected to the grounded terminal via a resistor Rs1. The gate of the switching element N2 is connected to the OUTL terminal. The cathode of the diode D2 is connected to one end of the output capacitor Co. The other end of the capacitor Co is connected to the grounded terminal. At the one end of the output capacitor Co, the output voltage Vout appears.

To the node at which the switching element N1 and the diode D1 are connected together, the SW terminal and one end of the capacitor Cbt for bootstrapping are connected. The other end of the capacitor Cbt is connected to the BOOT terminal.

The LED driving device may be configured to include at least one of the switching elements N1 and N2.

To the one end of the output capacitor Co at which the output voltage Vout appears, the anodes of the LED arrays 41 to 46 are connected. The LED arrays 41 to 46 each include a plurality of LEDs that are connected in series. The cathodes of the LED arrays 41 to 46 are connected respectively to the LED1 to LED6 terminals.

The LED arrays 41 to 46 may each include LEDs which are connected, for example, in series and parallel instead of in series, or may each include only one LED. Also, the number of LED arrays that can be driven is not limited to six; it may instead be any number such as four. A configuration is also possible that can drive only one LED array constituting a single channel.

Next, an internal configuration of the LED driving device 30 will be described.

The internal voltage generator 1, when the EN terminal is at high level, generates an internal voltage Vreg (for example, 5 V) from the input voltage Vin fed to the VCC terminal and outputs the internal voltage Vreg from the VREG terminal. The internal voltage Vreg is used as a supply voltage for internal circuits included in the LED driving device 30. To the VREG terminal, the capacitor Cvg is connected.

To the current sensor 2, the CSH, CSL, and SD terminals are connected.

To the charge pump 3, the CPP, CPM, and CP terminals are connected. Between the CPP and CPM terminals, a capacitor Ccp1 for charge pumping is connected. To the CP terminal, which is the output terminal of the charge pump 3, a capacitor Ccp2 is connected. The charge pump 3 boosts the internal voltage Vreg fed to it, and outputs the result from the CP terminal.

The oscillator 4, in accordance with an input signal to the SYNC terminal or the terminal voltage at the RT terminal, generates a predetermined clock signal and outputs it to the slope generator 5.

The slope generator 5, based on the clock signal fed from the oscillator 4, generates a slope signal (triangular-wave signal) Vslp and outputs it to the PWM comparator 7. The current sensor 2 has a function of giving an offset to the slope signal Vslp in accordance with the CSL terminal voltage, which results from converting the current passing through the switching element N2 using the resistor Rs1.

By adjusting the resistance value of a resistor Rrt connected to the RT terminal, it is possible to determine the charging and discharging current through the internal capacitor in the oscillator 4, and thereby to set the oscillation frequency of the slope signal (and hence the oscillation frequency FOSC of the boost/buck DC-DC converter). The LED driving device 30 includes the SYNC terminal for receiving clock input for external synchronization of the boost/buck DC-DC converter. With the LED driving device 30, it is possible, using the RT or SYNC terminal, to control to vary the oscillation frequency of the DC-DC converter freely and accurately. When, for example, the LED driving device 30 is used as a means for controlling a backlight of a vehicle-mounted display device, by appropriately setting the external synchronization oscillation frequency via the SYNC terminal in accordance with the control for switching radio reception frequencies, it is possible to prevent the oscillation frequency of the DC-DC converter from falling in the frequency band of radio noise, and thus it is possible to control the backlight without degrading radio reception quality.

The spectrum spreader 6 can vary the switching frequency of the DC-DC converter and thereby reduce average noise. The spectrum spreader 6 is turned on and off via the SYNC terminal.

The PWM comparator 7 generates an internal PWM signal by comparing an error signal Verr, which is fed to the non-inverting input terminal (+) of the comparator 7, and the slope signal Vslp, which is fed to an inverting input terminal (−) of the comparator 7, and outputs the internal PWM signal to the control logic circuit 8.

The control logic circuit 8, based on the internal PWM signal, generates driving signals for the high-side driver 9, the transistor 10, and the low-side driver 11.

The high-side driver 9, based on the driving signal fed from the control logic circuit 8, pulse-drives the OUTH terminal voltage (the gate voltage of the switching element N1) between the BOOT terminal voltage and the SW terminal voltage. The switching element N1 is turned on and off based on the gate voltage fed from the high-side driver 9.

The switching element 10 is turned on and off based on the driving signal fed from the control logic circuit 8, and switches between conducting and cut-off states of the path between the SW terminal and the grounded terminal.

The low-side driver 11, based on the driving signal fed from the control logic circuit 8, pulse-drives the gate voltage of the switching element N2 between the output voltage CP of the charge pump 3 and the ground voltage.

The switching element N2 is turned on and off based on the gate voltage fed from the low-side driver 11.

To the LED1 to LED6 terminals, LED terminal voltages Vled1 to Vled6 are applied respectively as the cathode voltages of the LED arrays 41 to 46. The selector 16 selects the lowest voltage among the LED terminal voltages Vled1 to Vled6 and outputs it to one of the inverting input terminals (−) of the error amplifier 15. To the other inverting input terminal (−) of the error amplifier 15, the OVP terminal voltage is applied, which results from dividing the output voltage Vout with voltage division resistors Rovp1 and Rovp2. To the non-inverting input terminal (+) of the error amplifier 15, a reference voltage Vref is applied. The error amplifier 15 generates the error signal Verr by amplifying the difference between the lower of the voltages applied to the two inverting input terminals (−) and the reference voltage Vref, and outputs the error signal Verr to the PWM comparator 7. Only during start-up is feedback control performed based on the OVP terminal for faster start-up, and after start-up, feedback control is performed based on the output of the selector 16.

The output terminal of the error amplifier 15 is connected to the COMP terminal. The COMP terminal is connected to the grounded terminal via a resistor Rpc and a capacitor Cpc which are externally connected in series.

The soft starter 13 controls the voltage level of the error signal Verr so as to increase gently. This helps prevent an overshoot in the output voltage Vout and an inrush current.

The protection circuit 17 includes a TSD circuit (overheat protection circuit), an OCP circuit, an OVP circuit, an LED open detection circuit (OPEN), an LED short detection circuit (SHORT), an output short protection circuit (SCP), and a UVLO circuit.

The TSD circuit shuts down the circuits other than the internal voltage generator 1 when the junction temperature of the LED driving device 30 becomes, for example, equal to or higher than 175° C. The TSD circuit resumes circuit operation when the junction temperature of the LED driving device 30 becomes, for example, equal to 150° C.

The current sensor 2 monitors the CSH terminal voltage (input current detection voltage), which results from converting the current passing through the switching element N1 to a voltage signal using the resistor Rsh, and instructs the OCP circuit to perform overcurrent protection when the CSH terminal voltage becomes, for example, equal to or lower than Vin−0.6 V. The OCP circuit, when performing overcurrent protection, turns off DC-DC switching.

To the SD terminal, the gate of the transistor M1 is connected. The current sensor 2, upon detecting an overcurrent passing in the resistor Rsh (overcurrent passing in the inductor L1), turns off the transistor M1 to cut off the path from the application terminal for the input voltage Vin to the inductor L1.

The OVP circuit monitors the OVP terminal voltage and, when the OVP terminal voltage becomes, for example, equal to or higher than 2.0 V, performs overvoltage protection. When overvoltage protection is performed, DC-DC switching is turned off.

In the LED open detection circuit (OPEN), when any of the LED terminal voltages Vled1 to Vled6 is, for example, equal to or lower than 0.3 V and in addition the OVP terminal voltage is, for example, equal to or higher than 2.0 V, LED open detection is performed, so that any LED array that is detected to be open is latched off.

In the LED short detection circuit (SHORT), when any of the LED terminal voltages Vled1 to Vled6 is, for example, equal to or higher than 4.5 V, a built-in counter starts counting and, about 100 ms (if FOSC=300 kHz) thereafter, latching is performed such that any LED array detected to be short-circuited is latched off. To the SHT terminal, the resistor Rsht for the LED short protection setting is connected.

In the output short protection circuit (SCP), when the OVP terminal voltage becomes, for example, equal to or lower than 0.57 V or when any of the LED terminal voltages Vled1 to Vled6 becomes, for example, equal to or lower than 0.3 V, a built-in counter starts counting and, about 100 ms (if FOSC=300 kHz) thereafter, latching is performed such that the circuits other than the internal voltage generator 1 are shut down. The output short protection circuit can provide ground short-circuit protection both in cases where the LED arrays 41 to 46 are short-circuited to ground at the anode side (DC-DC output terminal side) and where they are short-circuited to ground at the cathode side.

The UVLO circuit is, when the input voltage Vin becomes, for example, equal to or lower than 3.5 V or when the internal voltage Vreg becomes, for example, equal to or lower than 2.0 V, shuts down the circuits other than the internal voltage generator 1.

The protection circuit 17, based on fault detection states in the OVP and OCP circuits, outputs a fault detection signal from the FAIL1 terminal to outside. To the FAIL1 terminal, the VREG terminal is connected via the resistor Rf1. When either of the OVP and OCP circuits detects a fault, the protection circuit 17 turns on an unillustrated transistor connected to the FAIL1 terminal and thereby turns the output from the FAIL1 terminal to low level.

The protection circuit 17, based on the fault detection states in the LED open detection circuit, the LED short detection circuit, and the output short protection circuit (SCP), outputs a fault detection signal from the FAIL2 terminal to outside. To the FAIL2 terminal, the VREG terminal is connected via the resistor Rf2. When any of the LED open detection circuit, the LED short detection circuit, and the output short protection circuit (SCP) detects a fault, the protection circuit 17 turns on an unillustrated transistor connected to the FAIL2 terminal and thereby turns the output from the FAIL2 terminal to low level.

The Schmitt trigger 21 transmits to the constant current driver 18 a PWM dimming signal that is fed to the PWM terminal from outside. The PWM dimming signal is fed in as a pulse signal.

The LED current setter 19 sets in the constant current driver 18 a constant current value in accordance with the resistance value of a resistor Riset that is connected to the ISET terminal. The reference voltage source 20 generates the reference voltage Vref.

The constant current driver 18 includes constant current circuits 181 for six channels that are arranged between the LED1 to LED6 terminals, respectively, and the LGND terminal, which is connected to the grounded terminal. The constant current driver 18 further includes a PWM control logic circuit 182. The PWM control logic circuit 182 turns on and off the constant current circuit 181 in accordance with the on-duty of PWM dimming indicated by the PWM dimming signal. Specifically, the constant current circuit 181 is kept on during an LED-current-on period in accordance with the on-duty of PWM dimming, and is kept off during an LED-current-off period in accordance with the on-duty of PWM dimming. When the constant current circuit 181 is on, the output current ILED with the constant current value set by the LED current setter 19 passes.

The VDISC terminal is connected to the output discharger 14. The VDISC terminal is connected to one end of the output capacitor Co at which the output voltage Vout appears. Starting up with electric charge left in the output capacitor Co may cause flickering in LEDs. To avoid that, the output capacitor Co needs to be discharged at start-up, but discharging it only across the discharging path through the resistors Rovp1 and Rovp2 for the OVP setting can take time; thus the residual electric charge in the output capacitor Co is discharged also with the output discharger 14. This discharging is performed when the DC-DC converter is off (when a signal applied to the EN terminal drops to low level or when protection is in effect).

The GND terminal is a terminal to which the GND level for small-signal blocks inside the LED driving device 30 is applied.

<2. DC-DC Controller>

Next, a DC-DC controller 301 (a circuit block including the oscillator 4, the slope generator 5, the PWM comparator 7, the control logic circuit 8, the high-side driver 9, the transistor 10, the low-side driver 11, and the error amplifier 15) which is included in the LED driving device 30 will be described in detail.

The error amplifier 15 amplifies the difference between the reference voltage Vref and whichever is lower of the lowest value selected by the selector 16 among the LED terminal voltages Vled1 to Vled6 and the OVP terminal voltage, to generate an error voltage Verr. The more the lower of the two voltages mentioned above is lower than the reference voltage Vref, the higher the voltage value of the error voltage Verr.

The PWM comparator 7 compares the error voltage Verr with the slope signal Vslp to generate the internal PWM signal. The internal PWM signal is at high level when the error voltage Verr is higher than the slope signal Vslp, and is at low level when the error voltage Verr is lower than the slope signal Vslp.

The control logic circuit 8 turns on and off the switching element N1, the transistor 10, and the switching element N2 based on the internal PWM signal. Specifically, when the internal PWM signal is at high level, the control logic circuit 8 keeps the switching elements N1 and N2 on and keeps the transistor 10 off. By contrast, when the internal PWM signal is at low level, the control logic circuit 8 keeps the switching elements N1 and N2 off and keeps the transistor 10 on.

Thus, the error amplifier 15, the PWM comparator 7, the control logic circuit 8, the high-side driver 9, and the low-side driver 11 constitute a feedback control controller, which performs feedback control where switching pulses are fed from the OUTH and OUTL terminals to the switching elements N1 to N2 so that the lowest value among the LED terminal voltages Vled1 to Vled6 equals the reference voltage Vref. That is, the DC-DC controller 301 includes the feedback control unit.

When the switching elements N1 and N2 are kept on and the transistor 10 is kept off, a current passes through a path leading from the application terminal for the input voltage Vin to the grounded terminal via the resistor Rsh, the switching element N1, the inductor L1, and the switching element N2, and thereby electric energy is stored in the inductor L1. Here, if electric charge has been accumulated in the output capacitor Co, the output current ILED flows from the output capacitor Co to the anodes of the LED arrays 41 to 46. Since the diode D2 is reverse-biased, no current flows from the output capacitor Co into the switching element N2.

When the switching elements N1 and N2 are kept off and the transistor 10 is kept on, due to a counter-electromotive force generated in the inductor L1, a current passes through a path leading from the grounded terminal via the transistor 10, the inductor L1, and the diode D2. This current flows into the LED arrays 41 to 46 as the output current ILED and also into the grounded terminal via the output capacitor Co, thereby charging the output capacitor Co.

The operation described above is repeated, so that the output voltage Vout obtained by boosting and bucking the input voltage Vin is fed to the LED arrays 41 to 46.

When the duty ratio of the switching element N1 (the proportion of the on-period in one cycle) is lower than 50%, the input voltage Vin is bucked, and when the duty ratio of the switching element N1 is higher than 50%, the input voltage Vin is boosted. In this way, with the LED driving device 30, it is possible to switch between boosting and bucking operation easily and appropriately with a simple configuration.

Thus, with the LED driving device 30, regardless of whether the input voltage Vin is higher or lower than the desired output voltage Vout, it is always possible to obtain a desired output voltage Vout. For example, even in a case where the input voltage Vin varies within the range of 6 to 18 V while the desired value of the output voltage Vout is 16 V, it is possible to obtain the desired output voltage Vout. Such a configuration is suitable for, for example, applications which need to deal with the input voltage Vin that is directly fed from a battery (such as LED driver ICs for controlling the backlight of a car navigation monitor).

The LED driving device 30 includes the transistor 10 as a means for preventing ringing in a light-load or no-load condition. It is preferable to design the transistor 10 to have the minimum current capacity necessary to pull out a minute current that constitutes ringing noise, to avoid an unnecessary increase in chip area or a drop in conversion efficiency. The transistor 10 and the switching elements N1 and N2 are controlled to switch complementarily (exclusively).

With this configuration, even when, in a light-load or no-load condition, the output current ILED lowers to go into a state with a disturbed waveform called ringing (what is called a discontinuous mode), ringing noise can be diverted to the grounded terminal via the transistor 10, and thus it is possible to enhance the stability of the boosting and bucking operation.

The term "complementarily (exclusively)" used in the above description covers not only operation in which the on/off states of the switching elements N1 and N2 and the transistor 10 are reversed completely but also operation in which, to prevent a through current and the like, periods in which the switching elements N1 and N2 and the transistor 10 are both off are secured.

<3. Switching Pulse Addition Control>

Next, switching pulse addition control, which is a function provided in the LED driving device 30 according to this embodiment, will be described.

Figure 2:
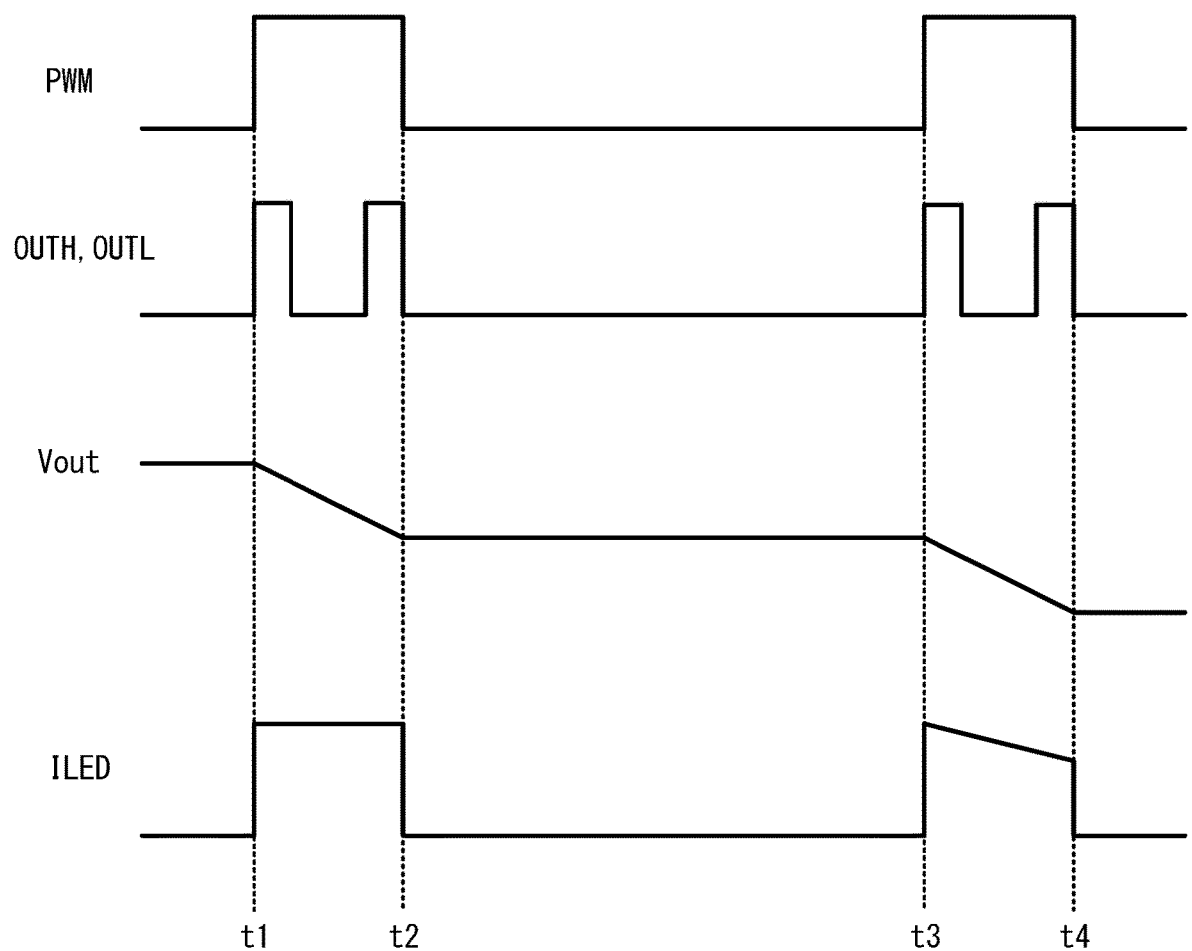
FIG. 2 A timing chart as a comparative example with respect to pulse addition control.

FIG. 2 is a timing chart as a comparative example with respect to pulse addition control, indicating, from top down, the PWM dimming signal, the switching pulses fed out from the OUTH and OTUTL terminals, the output voltage Vout, and the output current ILED. The PWM dimming signal indicates, when at high level (on-level), that the LED current is on and, when at low level (off-level), that the LED current is off.

As shown in FIG. 2, at time point t1, under the control of the PWM control logic circuit 182, the constant current circuit 181 turns the output current ILED on. As a result, the LED terminal voltages Vled1 to Vled6 drop sharply due to the forward voltages across the LED arrays 41 to 46, and the DC-DC controller 301, as the error amplifier 15 and the PWM comparator 7 operate, starts feeding out switching pulses from the OUTH and OUT terminals. At time point t2, under the control of the PWM control logic circuit 182, the constant current circuit 181 turns off the output current ILED. This causes the LED terminal voltages Vled1 to Vled6 to rise sharply, and thus the switching pulses that the DC-DC controller 301 feeds out from the OUTH and OUTL terminals stop, remaining at off-level.

At the start of feeding-out of switching pulses, the output voltage Vout drops due to the LED load across the LED arrays 41 to 46. This is because, at the start of feeding-out of switching pulses, while the current through the inductor L1 increases from zero so that energy is stored gradually in the inductor L1, simultaneously the LED load appears. As shown in FIG. 2, when the on-duty of PWM dimming is very low and the period between time points t1 and t2 is short, due to an insufficient number of switching pulses, while the output voltage Vout is in the course of declining, at time point t2, the output current ILED is turned off and the output voltage Vout is held.

Then, when the LED current turns on again at time point t3, switching pulses start to be fed out, but the output voltage Vout declines further due to the LED load. This makes the output current ILED unstable, possibly preventing proper lighting of LEDs. Thus, when the on-duty of PWM dimming is very low, due to an insufficient number of switching pulses, the output voltage Vout drops every time the LED current turns on, possibly leading to an insufficient output voltage Vout.

Figure 3:
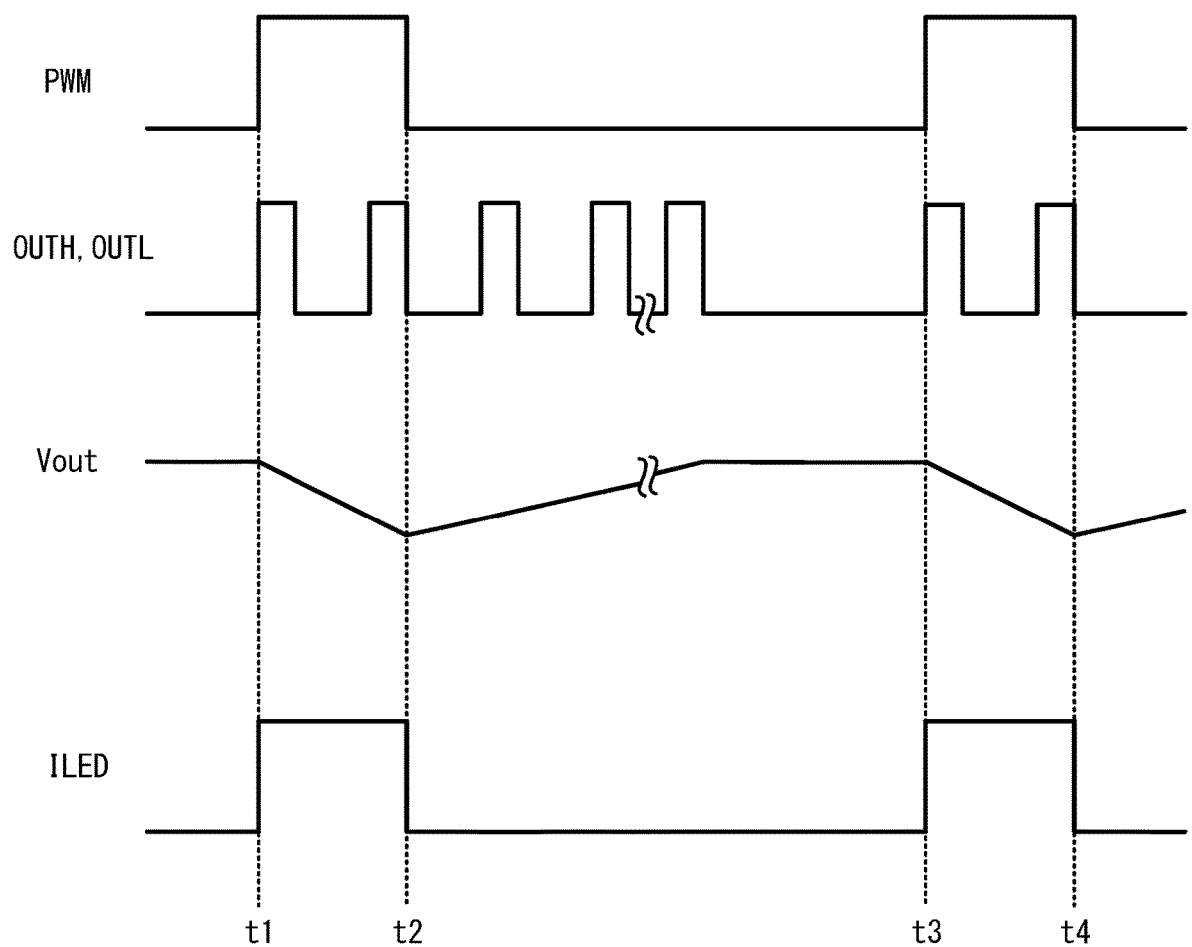
FIG. 3 A timing chart showing one example of pulse addition control.

To avoid this, in this embodiment, as in the timing chart shown in FIG. 3, after time point t2 at which PWM dimming switches from the LED-current-on period to the LED-current-off period, the control logic circuit 8 (that is, the DC-DC controller 301) feeds out a predetermined number of additional switching pulses from the OUTH and OUTL terminals. That is, the control logic circuit 8 serves as a pulse addition controller which performs pulse addition control. As a result, as shown in FIG. 3, after the LED current turns off, the output capacitor Co is charged, and the output voltage Vout increases. Thus, even when the output voltage Vout drops during the LED-current-on period between time points t3 to t4, the output current ILED stays stable.

Thus, even when the on-duty of PWM dimming is very low, the drop in the output voltage Vout during the LED-current-on period can be compensated for by added switching pulses. Thus, it is possible to hold the output voltage Vout, and thus to stabilize the output current ILED and ensure proper lighting of LEDs.

The DC-DC controller 301 holds and uses, as the duty of added switching pulses, the duty of the last switching pulse in the immediately preceding LED-current-on period (t1 to t2). The DC-DC controller 301 uses, as the duty of switching pulses when the LED-current-on period (t3 to t4) starts, the duty of the last switching pulse in the previous LED-current-on period (t1 to t2).

Figure 4:
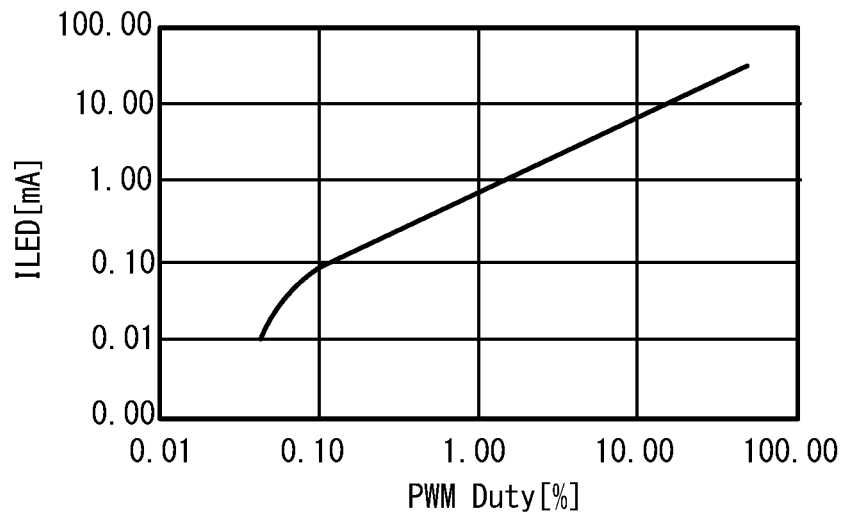
FIG. 4 A graph showing one example of the relationship of the output current with a PWM dimming on-duty with respect to the comparative example.

FIG. 4 is a graph showing one example of the relationship of the output current ILED with the PWM dimming on-duty observed with control involving no switching pulse addition as in FIG. 2. In the example of FIG. 4, when the PWM dimming on-duty becomes lower than 0.1%, the output current ILED exhibits a steeper drop.

Figure 5:
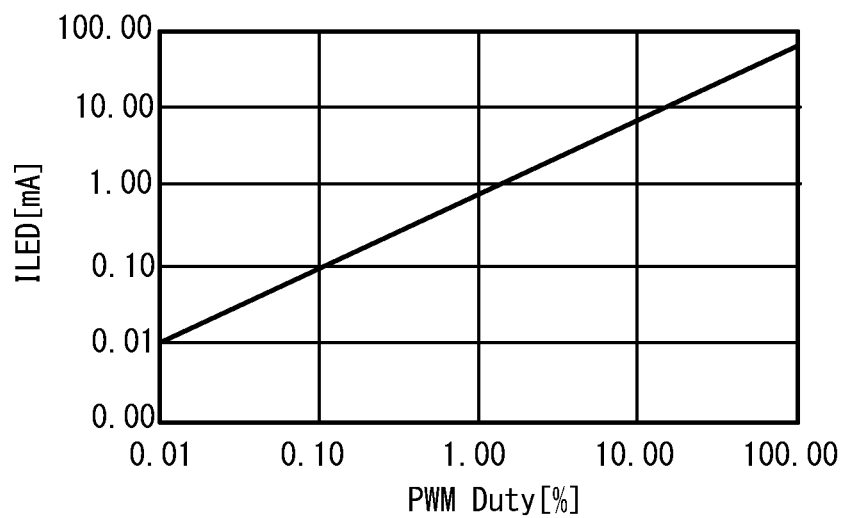
FIG. 5 A graph showing one example of the relationship of the output current with the PWM dimming on-duty observed when pulse addition control is performed.

FIG. 5 is a graph showing, in contrast, one example of the relationship of the output current ILED with the PWM dimming on-duty observed when pulse addition control involving addition of switching pulses as in FIG. 3 according to this embodiment is performed. In FIG. 5, in contrast to FIG. 4, even when the PWM dimming on-duty is lower than around 0.1%, it is possible to suppress a steeper drop in the output current ILED. Thus, with the example shown in FIG. 5, it is possible to deal with PWM dimming on-duties ranging from 100% to 0.01%. It is thus possible to achieve a dimming factor as high as 10,000 times.

It is preferable that the pulse addition control described above be performed across the entire range of PWM dimming on-duties from the lower limit (for example, 0.01%) to the upper limit (for example, 100%). In this way, it is possible to prevent unstable brightness due to a drop in the LED current resulting from switching of control modes caused by a change of the PWM dimming on-duty. However, when the PWM dimming on-duty is high, the output voltage Vout may be held satisfactorily with the LED-current-on period. In that case, pulse addition control may be performed, for example, only when the PWM dimming on-duty is lower than a predetermined threshold value.

<4. Variable Control on the Number of Added Pulses>

Figure 6:
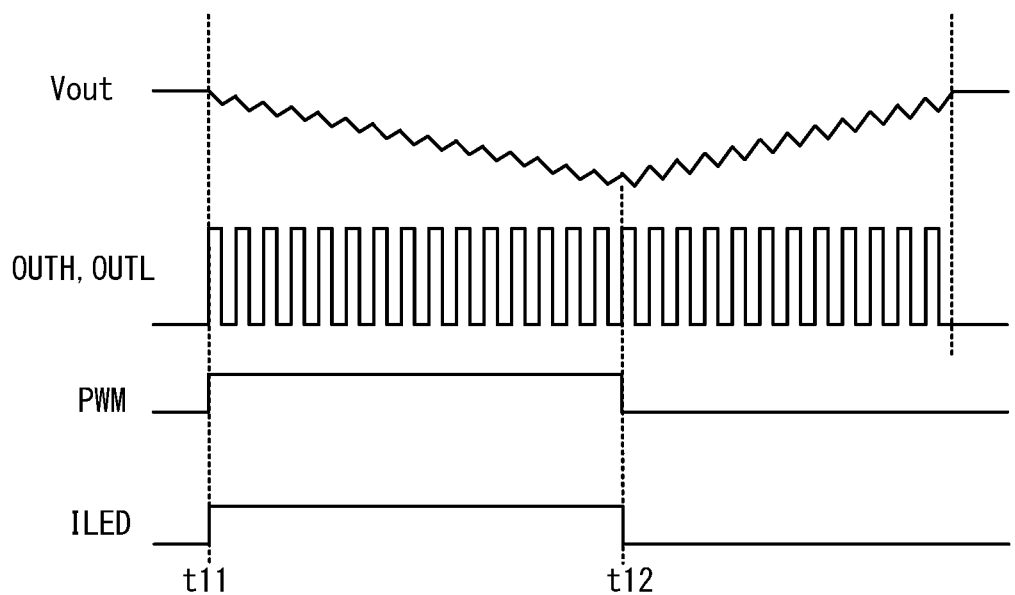
FIG. 6 A timing chart showing an example of specific waveforms under pulse addition control.

FIG. 6 is a timing chart showing one example of the pulse addition control described above, indicating, from top down, the output voltage Vout, the switching pulses fed out from the OUTH and OUTL terminals, the PWM dimming signal, and the output current ILED that passes in the LEDs. FIG. 6 shows more specific waveforms than FIG. 3 described earlier.

FIG. 6 shows a case where the PWM dimming on-duty is low, that is, a case where the period between time points t11 to t12, which is the LED-current-on period, is short. Although switching pulses are fed out during this period, their number is insufficient, and thus the output voltage Vout drops due to the LED load. After time point t12 at which the LED current turns off, switching pulses with twelve pulses are added. The output voltage Vout is thus compensated.

Figure 7:
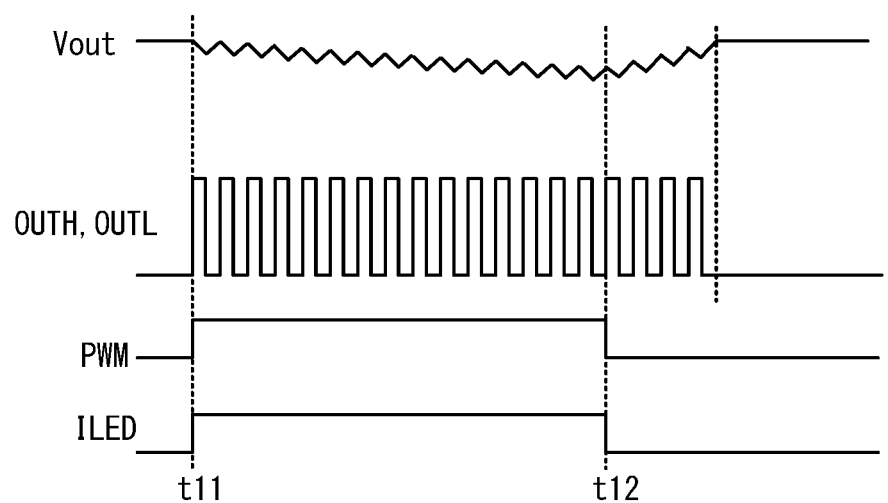
FIG. 7 A timing chart showing an example of specific waveforms under pulse addition control.

FIG. 7 is a diagram similar to FIG. 6, but shows a case where the LED load is light as compared with the case in FIG. 6. In this case, during the period between time points t11 and t12, which is the LED-current-on period, the drop in the output voltage Vout is smaller. If, in such a case, twelve switching pulses are added as in the case of FIG. 6, the output voltage Vout is excessively compensated. This may increase ripples in the output voltage Vout. Increased ripples may cause louder audible noise in the output capacitor Co.

In this LED driving device 30, it is also possible to give priority to compensating the output voltage Vout by setting a fixed number of added pulses in accordance with the heaviest LED load that can be driven by the LED driving device 30. In this case, however, when the LED load is light as mentioned above, the output voltage Vout may be compensated excessively, possibly leading to increased ripples in the output voltage Vout. Or, the capacity of the output capacitor Co needs to be adjusted to reduce ripples.

In view of the above, in this embodiment, the number of added pulses is variably set. Specifically, in FIG. 7, the LED load is lighter than in FIG. 6 and the drop in the output voltage Vout during the LED-current-on period is smaller. Thus switching pulses with four pulses, that is, fewer than in FIG. 6, are added. Thus the output voltage Vout is compensated adequately with added pulses. It is thus possible to reduce ripples in the output voltage Vout, and to reduce audible noise in the output capacitor Co.

In this way, in accordance with the LED load (the number of LEDs, the rated LED current value) that is driven by the LED driving device 30, the control logic circuit 8 varies the number of pluses in added switching pulses. For example, if the LED driving device 30 is used for the backlight of a vehicle-mounted display device, the LED load varies in accordance with the display size of the vehicle-mounted display device.

Figures 8, 9:
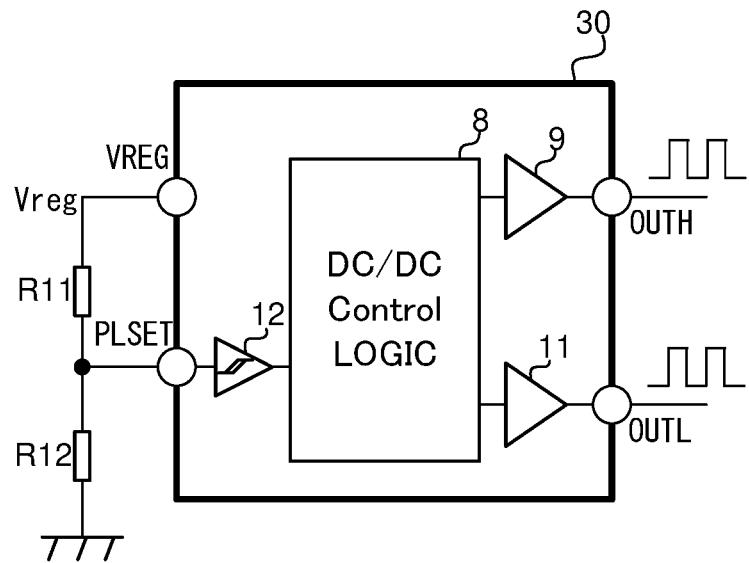
FIG. 8 A diagram showing a configuration example for setting the number of added switching pulses.
FIG. 9 A table showing one example of the relationship of the combination of resistance values with the set number of pulses.

The control logic circuit 8 varies the number of added pulses using the PLSET terminal. More specifically, as shown in FIG. 8, resistors R11 and R12 are connected in series between the VREG terminal and the grounded terminal, and the PLSET terminal is connected to the connection node between the resistors R11 and R12. The voltage applied to the PLSET terminal is fed to the control logic circuit 8 via the Schmitt trigger 12. In accordance with the combination of the resistance values of the resistors R11 and R12, the voltage division ratio for the internal voltage Vreg appearing at the VREG terminal changes, and thus the voltage applied to the PLSET terminal changes. In this way, the control logic circuit 12 varies the number of added pulses that are fed out from the OUTH and OUTL terminals in accordance with the voltage applied to the PLSET terminal.

FIG. 9 is a table showing one example of the relationship of the combination of the resistance values of the resistors R11 and R12 with the number of added pulses. As shown there, in accordance with the combination of the resistance values of the resistors R11 and R12, the number of added pulses are set variably among 0, 4, 8, 12, and 16.

The reason why the internal voltage Vreg is selected as the voltage that is divided by the resistors R11 and R12 is that, inside the control logic circuit 8, there is provided a comparator that compares the voltage applied to the PLSET terminal with a reference voltage, and the reference voltage is based on the internal voltage Vreg. This means that, even if the internal voltage Vreg varies, also the reference voltage varies, and thus it is possible to avoid an error in checking the voltage applied to the PLSET terminal against a threshold value, and thus to avoid erroneous setting of the number of added pulses. The Schmitt trigger 12 has a function of preventing an indefinite signal when a voltage close to the threshold value of the comparator mentioned above is applied to the PLSET terminal.

The number of added pulses does not necessarily need to be set with resistors; it may instead be set with, for example, the capacitance value of an externally connected capacitor or with a register.

<5. Modified Examples of Switching Pulse Addition Control>

Figure 10:
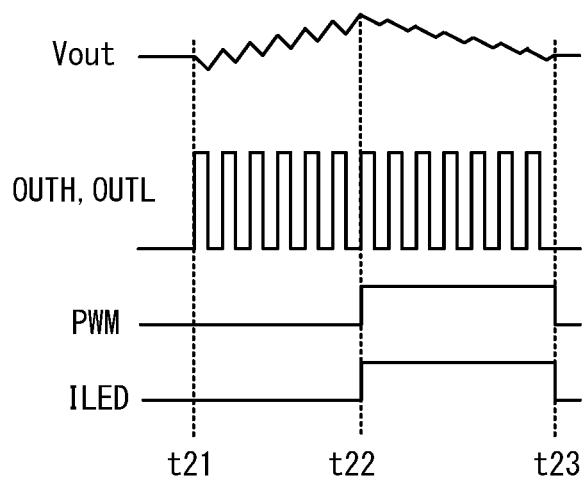
FIG. 10 A timing chart showing an example of a waveform under pulse addition control according to a first modified example.

FIG. 10 is a timing chart similar to FIG. 6, but shows one example of switching pulse addition control according to a first modified example.

In this modified example, as shown in FIG. 10, the output current ILED passing in the LEDs is on during the period between time points t22 and t23 when the PWM dimming signal is at on-level. In FIG. 10, unlike in FIG. 6, switching pulses are added during the period between time points t21 and t22, immediately before the PWM dimming signal switches to on-level.

Since there is no LED load in the period immediately before the PWM dimming signal switches to on-level, adding switching pulses raises the output voltage Vout. When the PWM dimming signal turns to on-level and the output current ILED passes in the LEDs, switching pulses continue to be generated, and the output voltage Vout drops to a stable value under feedback control.

With this modified example, even when the PWM dimming on-duty is very low, the output voltage that drops during the LED-current-on period is compensated by added switching pulses. Thus, it is possible to hold the output voltage Vout, and thus to stabilize the output current ILED and ensure proper lighting of LEDs. In particular in this modified example, switching pulses are added to accumulate energy in the inductor L1 in advance before the LED load appears, and only then does the LED load appear. This helps reduce the drop in the output voltage Vout during the LED-current-on period, and helps reduce ripples in the output voltage Vout. Thus, it is possible to reduce audible noise in the output capacitor Co.

In this modified example, the PWM dimming signal is sampled to measure the period from the turning-off to the turning-on of the PWM dimming signal, and using the measured period and the number of added switching pulses, when to add switching pulses can be determined.

Figure 11:
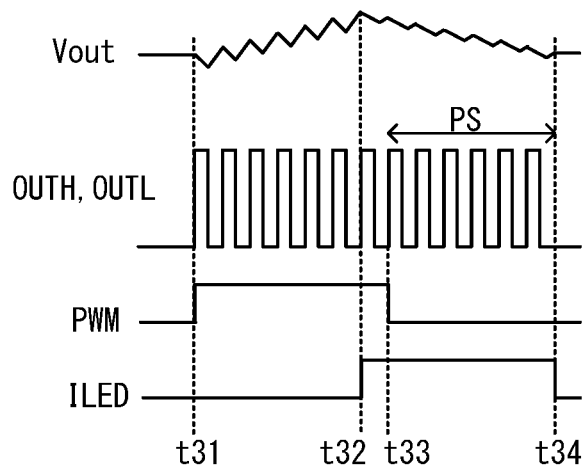
FIG. 11 A timing chart showing an example of a waveform under pulse addition control according to a second modified example.

Next, FIG. 11 is a timing chart similar to FIG. 6, but shows one example of switching pulse addition control according to a second modified example.

In FIG. 11, the output current ILED is turned on at time point t32, which is delayed, by the period in which switching pulses PS are added immediately after time point t33 at which the PWM dimming signal switches to off-level, from time point t31 at which the PWM dimming signal turns on-level. The period between time points t32 to 34 during which the output current ILED is on equals the period between time points t31 to 33 during which the PWM dimming signal is at on-level. Switching pulses are added during the period between time points t31 to t32, and during the period between time points t32 to t34, the appearance of the LED load causes switching pulses to be generated. FIG. 11 depicting this modified example shows the same waveforms as FIG. 10 depicting the first modified example except for the PWM dimming signal.

This modified example also provides workings and benefits similar to those provided by the first modified example described earlier.

In both the first and second modified examples described above, the number of added switching pulses can be variably set according to the LED load with resistors etc. like those mentioned previously.

<6. PWM Dimming/DC Dimming>

The LED driving device according to the first modified example of this embodiment has a function of switching between PWM dimming and DC dimming through input of a setting. This function will now be described. DC dimming is a method of dimming in which the output current ILED is kept on and the current value of the LED current is varied under the control of the constant current driver 18. That is, DC dimming is equivalent to PWM dimming when the on-duty is 100%.

Figure 12:
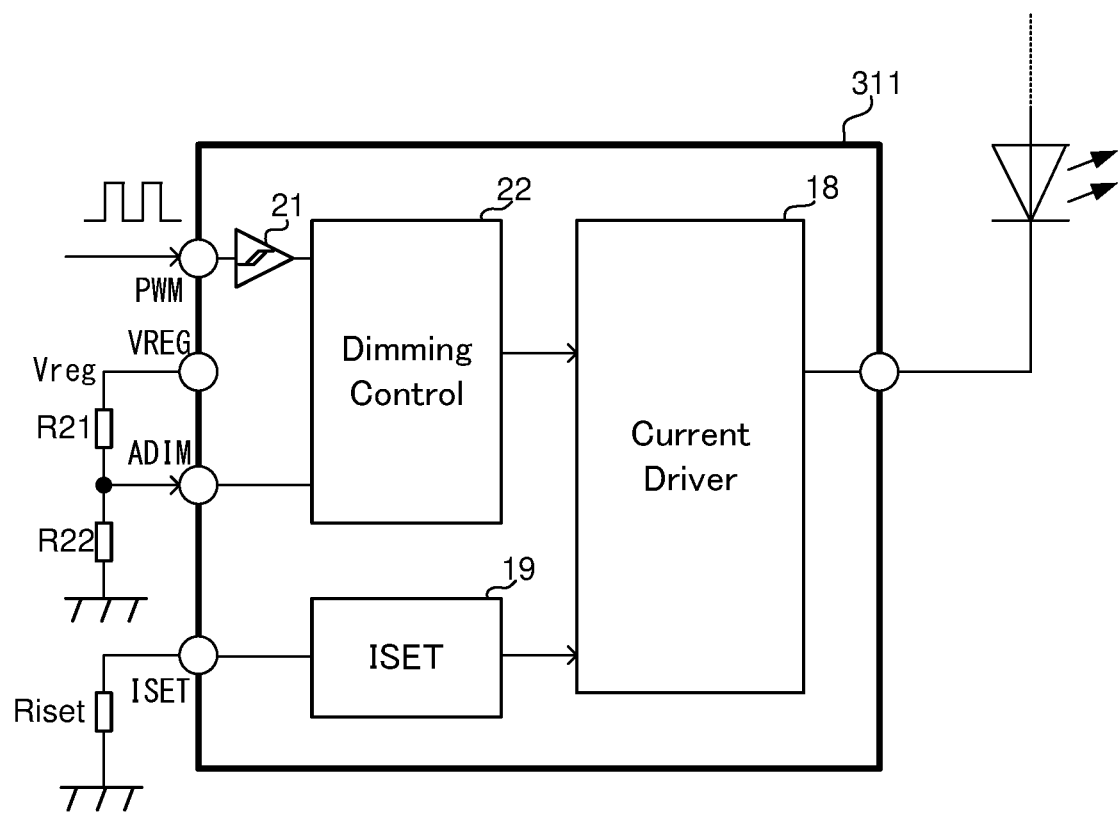
FIG. 12 A diagram showing part of a configuration of the LED driving device according to the first modified example.

FIG. 12 is a diagram showing a configuration with respect to the function of switching between PWM dimming and DC dimming. FIG. 12 shows part of the internal configuration of the LED driving device 311, which is the first modified example of the LED driving device 30 (FIG. 1) according to the embodiment described above. The LED driving device 311, while being based on the configuration of the LED driving device 30, additionally includes an ADIM terminal as an external terminal, and also a dimming controller 22 as an internal circuit block. The PWM dimming signal fed to the PWM terminal is fed to the dimming controller 22 via the Schmitt trigger 21. Resistors R21 and R22 are connected in series between the VREG terminal and the grounded terminal, and to the connection node between the resistors R21 and R22, the ADIM terminal is connected. In accordance with the combination of the resistance values of the resistors R21 and R22, the voltage division ratio for the internal voltage Vreg appearing at the VREG terminal changes, and the voltage (analogue dimming signal) applied to the ADIM terminal changes.

In accordance with the voltage applied to the ADIM terminal, an LED current ratio threshold value according to which to switch between PWM dimming and DC dimming is set. That is, the LED current ratio threshold value can be set with the combination of the resistance values of the resistors R21 and R22. The LED current ratio is a ratio assuming that the LED current value set via the ISET terminal is 100%. For example, in accordance with the combination of the resistance values of the resistors R21 and R22, the LED current ratio threshold value is set at 100%, 50%, 25%, or 12.5%.

A set LED current ratio is set in accordance with the duty of the PWM dimming signal. The dimming controller 22 compares the LED current ratio threshold value that is set, with the set LED current ratio that is set. The dimming controller 22, when the set LED current ratio is equal to or higher than the LED current ratio threshold value, instructs the constant current driver 18 to perform DC dimming with a constant current value corresponding to the set LED current ratio assuming the LED current value set via the ISET terminal is 100%.

On the other hand, the dimming controller 22, when the set LED current ratio is lower than the LED current ratio threshold value, instructs the constant current driver 18 to perform PWM dimming with an on-duty in accordance with the set LED current ratio, with, as the constant current value, a current value in accordance with the LED current ratio threshold value assuming that the LED current value set via the ISET terminal is 100%. When PWM dimming is performed, the pulse addition control is performed as described earlier.

Specific examples of switching between PWM dimming and DC dimming will be described with reference to FIGS. 13 to 15. FIG. 11 shows a case where the LED current ratio threshold value is set at 50%. In this case, when the set LED current ratio is equal to or higher than 50%, DC dimming is performed, and, when the set LED current ratio is lower than 50%, PWM dimming is performed. Thus, when the set LED current ratio is, for example, 80%, DC dimming is performed, and, when the set LED current ratio is, for example, 40%, PWM dimming is performed.

Figure 13:
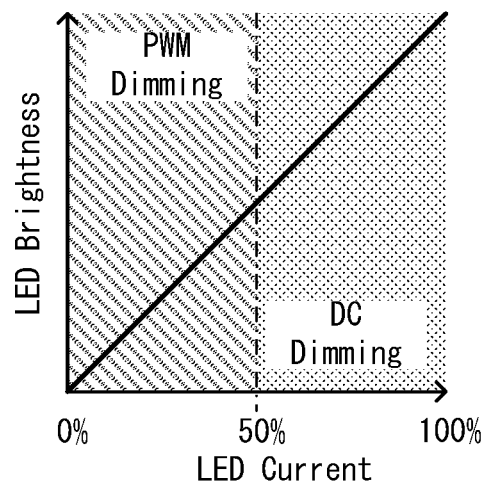
FIG. 13 A graph showing light dimmer switching in a case where the LED current ratio threshold value is set at 50%.

In the case shown in FIG. 13, if a dimming factor as high as 10,000 times can be achieved with PWM dimming as in one example mentioned previously, together with a dimming factor of twice with DC dimming, it is possible to achieve a dimming factor as high as 20,000 times.

Figure 14:
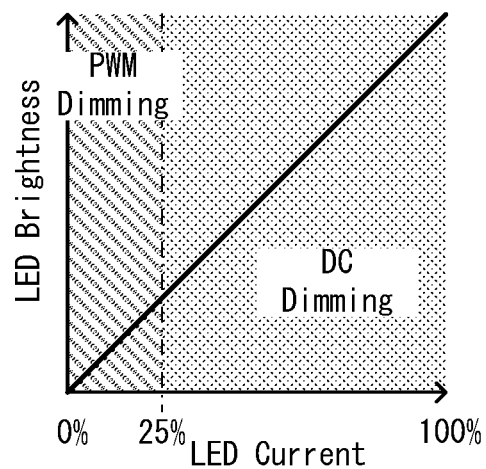
FIG. 14 A graph showing light dimmer switching in a case where the LED current ratio threshold value is set at 25%.
Figure 15:
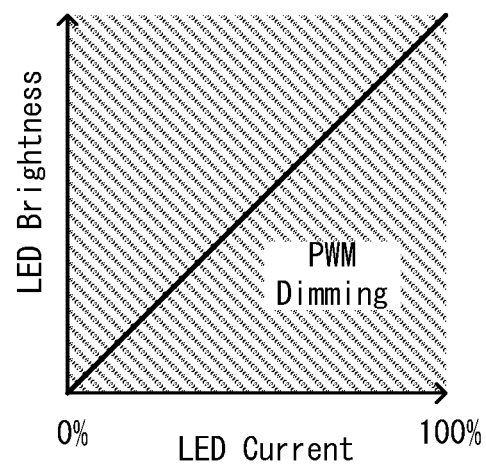
FIG. 15 A graph showing light dimmer switching in a case where the LED current ratio threshold value is set at 100%.

Likewise, FIG. 14 shows a case where the LED current ratio threshold value is set at 25%. In this case, when the set LED current ratio is, for example, 40%, unlike in the case shown in FIG. 13, DC dimming is performed. FIG. 15 shows a case where the LED current ratio threshold value is set at 100%. In this case, PWM dimming is performed at almost any set LED current ratios.

Figure 16:
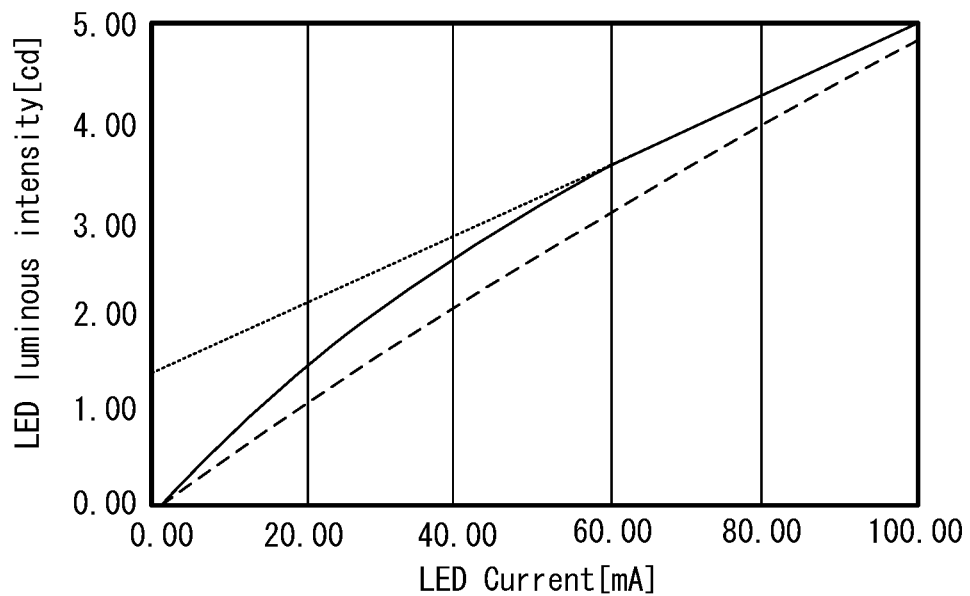
FIG. 16 A graph showing one example of the relationship of the LED current with the LED luminous intensity.

FIG. 16 is a graph showing one example of the relationship of the LED current with the LED luminous intensity. In FIG. 16, a solid line indicates DC dimming and a broken line indicates PWM dimming. As shown in FIG. 16, DC dimming tends to exhibit a steeper drop in the LED luminous intensity in a region of low LED currents. By contrast, PWM dimming tends to retain linear LED luminous intensity and exhibits a gentler drop in the LED luminous intensity even in a region of low LED currents. Thus, as mentioned above, performing DC dimming in a region of high LED current values and performing PWM dimming in a region of low LED current values makes it possible to reduce variation in the LED luminous intensity.

In addition, the area of the LED current where the LED luminous intensity shows a steeper drop differs depending on the properties of the LEDs that are used, and hence the configuration described previously that allows the LED current ratio threshold value to be variably set.

Figure 17:
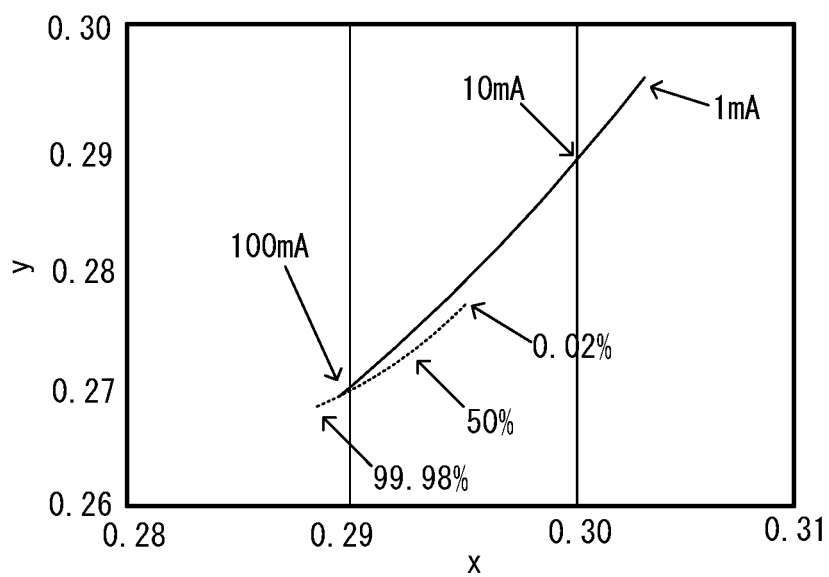
FIG. 17 A graph showing one example of the relationship of the LED current with chromaticity.

FIG. 17 is a graph showing one example of the relationship of the LED current with chromaticity. In FIG. 17, a solid line indicates DC dimming and a broken line indicates PWM dimming. As shown in FIG. 17, with DC dimming, as compared with PWM dimming, a smaller change in the LED current results in a larger change in chromaticity. Thus, as described above, switching between DC dimming and PWM dimming helps reduce change in chromaticity while achieving a high dimming factor.

<7. Delay Control of the LED Current Turning-on/Off Time>

The LED driving device according to the second modified example of this embodiment has a function for LED current on/off timepoint delay control. This function will now be described.

Figure 18:
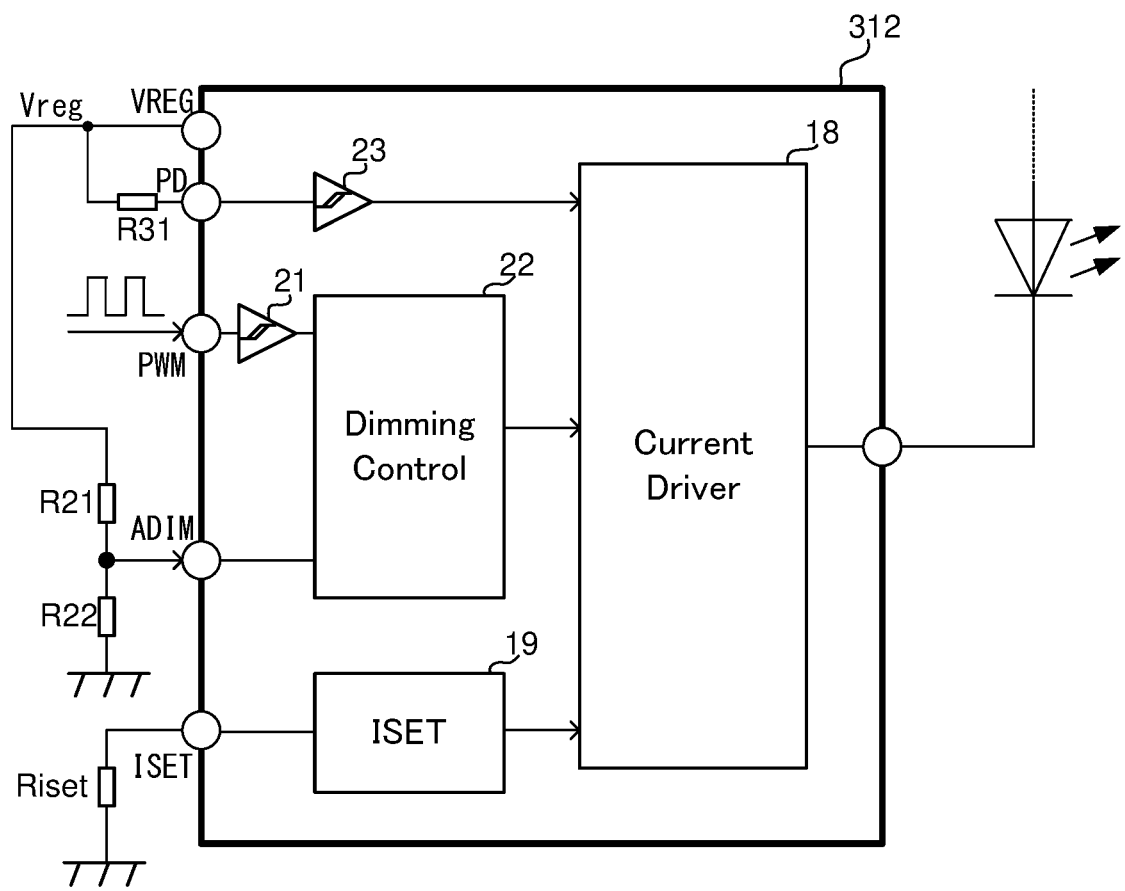
FIG. 18 A diagram showing part of the configuration of the LED driving device according to the second modified example.

FIG. 18 is a diagram showing part of the internal configuration of the LED driving device 312 according to the second modified example. The LED driving device 312, as compared with the LED driving device 311 (FIG. 12) according to the first modified example described above, is configured to additionally include a PD terminal as an external terminal and a Schmitt trigger 23 as an internal circuit block.

To the PD terminal, the VREG terminal is connected via a resistor R31. The signal applied to the PD terminal is fed to the constant current driver 18 via the Schmitt trigger 23. The PD terminal is used for setting a delay time in LED current on/off timepoint delay control, which will be described later.

Figure 19:
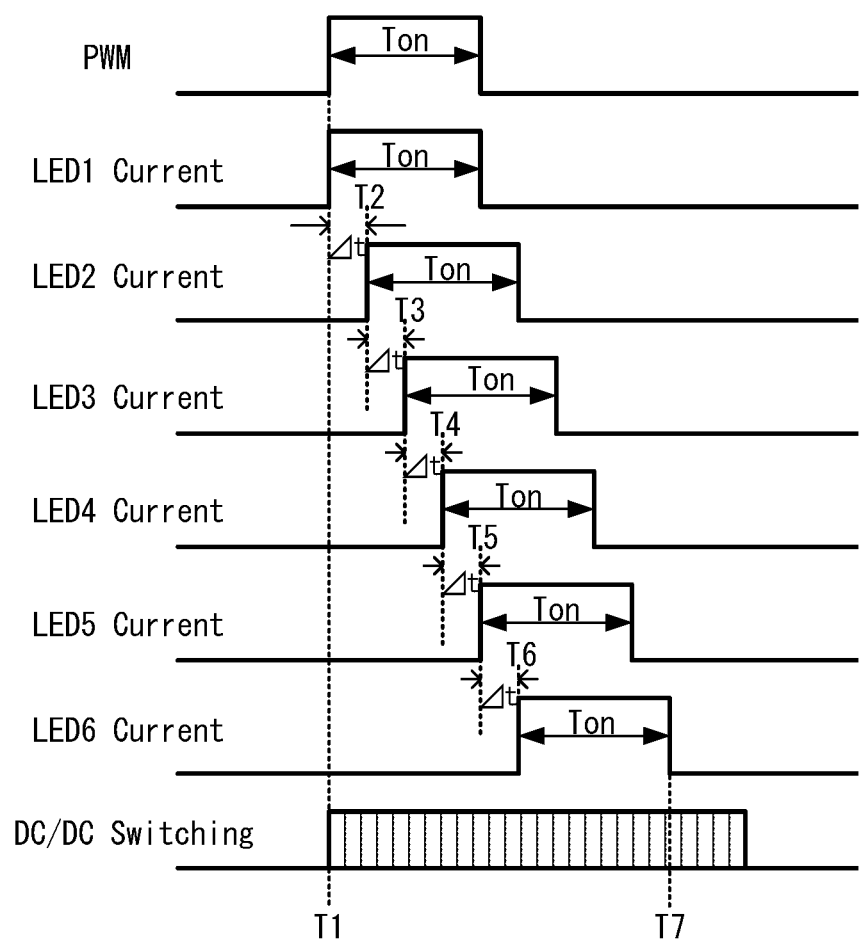
FIG. 19 A timing chart showing one example of delay control of the LED current on/off time point.

FIG. 19 is a timing chart showing one example of LED current on/off timepoint delay control, indicating, from top down, the PWM dimming signal, the output currents ILED that pass through the LED arrays 41 to 46 respectively, and the switching pulses.

As shown in FIG. 19, at time point T1 at which the PWM dimming signal switches to on-level, the constant current driver 18 turns on the constant current circuit 181 corresponding to the LED array 41 to start passing the output current ILED through the LED array 41. At this point, the DC-DC controller 301 starts generating switching pulses.

At time point T2 which is delayed from time point T1 by a predetermined delay time Δt, the constant current driver 18 turns on the constant current circuit 181 corresponding to the LED array 42 and starts passing the output current ILED through the LED array 42. Here, the delay time Δt is set via the PD terminal. From then on, at time points T3 to T6 which are each delayed by a predetermined delay time Δt from the previous time point of interest starting with T2, the constant current driver 21 turns on the constant current circuits 181 corresponding to the LED arrays 42 to 46 to start passing the output current ILED through the LED arrays 42 to 46.

When the LED-current-on period Ton passes after time point T1, the constant current driver 18, turns off the constant current circuit 181 corresponding to the LED array 41 to turn off the output current ILED passing through the LED array 41. From then on, at time points which are each delayed by the delay time Δt from the previous time point of interest starting with the time point at which the output current ILED passing through the LED array 41 is turned off, the constant current driver 18 turns off the constant current circuits 181 corresponding to the LED arrays 42 to 46 to turn off the output current ILED for the LED arrays 42 to 46.

Delay control as described above provides benefits such as reduced output load variation, reduced input voltage variation, a reduced input impedance, and the like.

In this embodiment, as shown in FIG. 19, the DC-DC controller 301 adds switching pulses after time point T7 which coincides in time with the end of the LED-current-on period Ton corresponding to the LED array 46 which is the last to have the LED current for it turned on. Thus, when the PWM dimming on-duty is very low, that is, when the LED-current-on period Ton is short, even if the output voltage Vout drops during the period between time points T1 and T7, the output voltage Vout can be compensated.

<8. Package Structure of the LED Driving Device>

Figure 20:
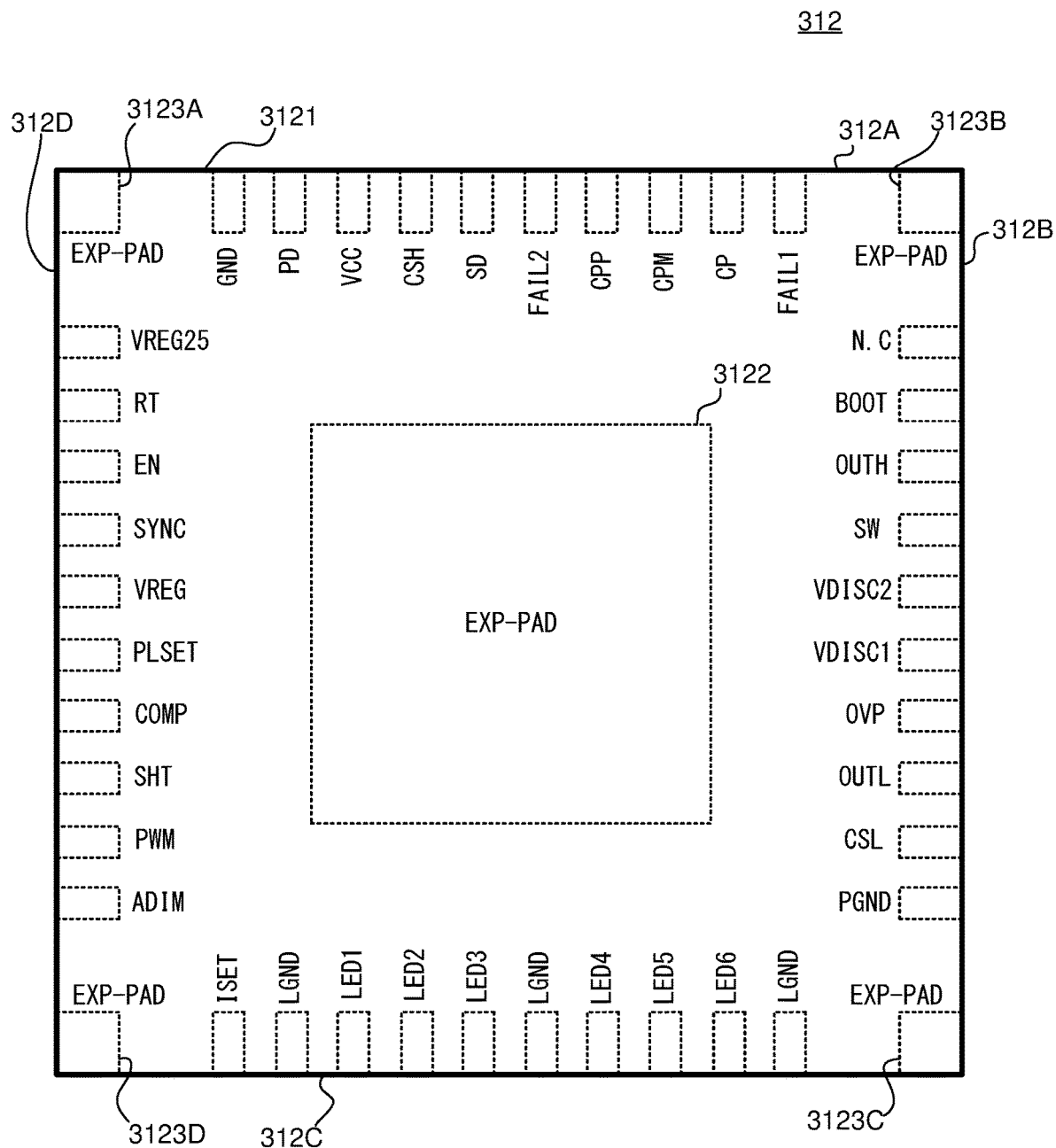
FIG. 20 A top view of a package of the LED driving device according to the second modified example.

FIG. 20 is a diagram showing a package product as seen from above as one configuration example of the LED driving device 312 according to the above-described second modified example. The LED driving device 312 shown in FIG. 20 is configured as a QFN (quad flat no-lead) package.

In the LED driving device 312, an IC chip is fixed to a support (such as a copper frame) with Ag paste or the like. The IC chip is connected to a lead frame (copper frame, etc.) with Au wires or the like. Parts of lead frame are coated with metal (such as tin) to form external terminals. The plated faces of the external terminals are exposed on the bottom face of the package. The IC chip, the support, and the lead frame are sealed in molding resin.

As shown in FIG. 20, in the LED driving device 312, a sealed body 3121 sealed in molding resin is formed in a square shape as seen from above. Along a first side 312A of the sealed body 3121, there are arranged external terminals including the GND terminal, the PD terminal, the VCC terminal, the CSH terminal, the SD terminal, the FAIL2 terminal, the CPP terminal, the CPM terminal, the CP terminal, and the FAIL1 terminal.

Along a second side 312B of the sealed body 3121 extending from one end of the first side 312A so as to be orthogonal to the first side 312A, there are arranged a non-connect terminal (N/C), the BOOT terminal, the OUTH terminal, the SW terminal, the VDISC2 terminal, the VDISC1 terminal, the OVP terminal, the OUTL terminal, the CSL terminal, and the PGND terminal. The PGND terminal is a ground terminal for the high-side driver 9, the switching element 10, and the low-side driver 11.

Along a third side 312C of the sealed body 312 opposite from the first side 312A, there are arranged the ISET terminal, the LGND terminal, the LED1 terminal, the LED2 terminal, the LED3 terminal, the LGND terminal, the LED4 terminal, the LED5 terminal, the LED6 terminal, and the LGND terminal.

Along a fourth side 312D of the sealed body 312 opposite from the second side 312B, there are arranged a VREG25 terminal, the RT terminal, the EN terminal, the SYNC terminal, the VREG terminal, the PLSET terminal, the COMP terminal, the SHT terminal, the PWM terminal, and the ADIM terminal. The VREG25 terminal is a terminal via which a voltage of 2.5 V generated by the internal voltage generator 1 is fed out.

The PLSET terminal and the ADIM terminal are, as shown in FIGS. 1 and 12, both connected to the VREG terminal via a resistor, and thus they are arranged along the same side as the VREG terminal, namely along the fourth side 312D, near the VREG terminal.

As shown in FIG. 20, the LED driving device 312 includes bottom-side heatsink pads 3122 and 3122A to 3123D. The bottom-side heatsink pad 3122 is formed in a square shape in the middle of the bottom face of the package. The bottom-side heatsink pads 3123A to 3123D are arranged in the four corners of the package. The bottom-side heatsink 3122 is connected to GND of the circuit board on which the package is mounted. The bottom-side heatsink pad 3122 and the bottom-side heatsink pads 3123A to 3123D are short-circuited to each other inside the package.

<9. Configuration of Chip Arrangement>

Figure 21:
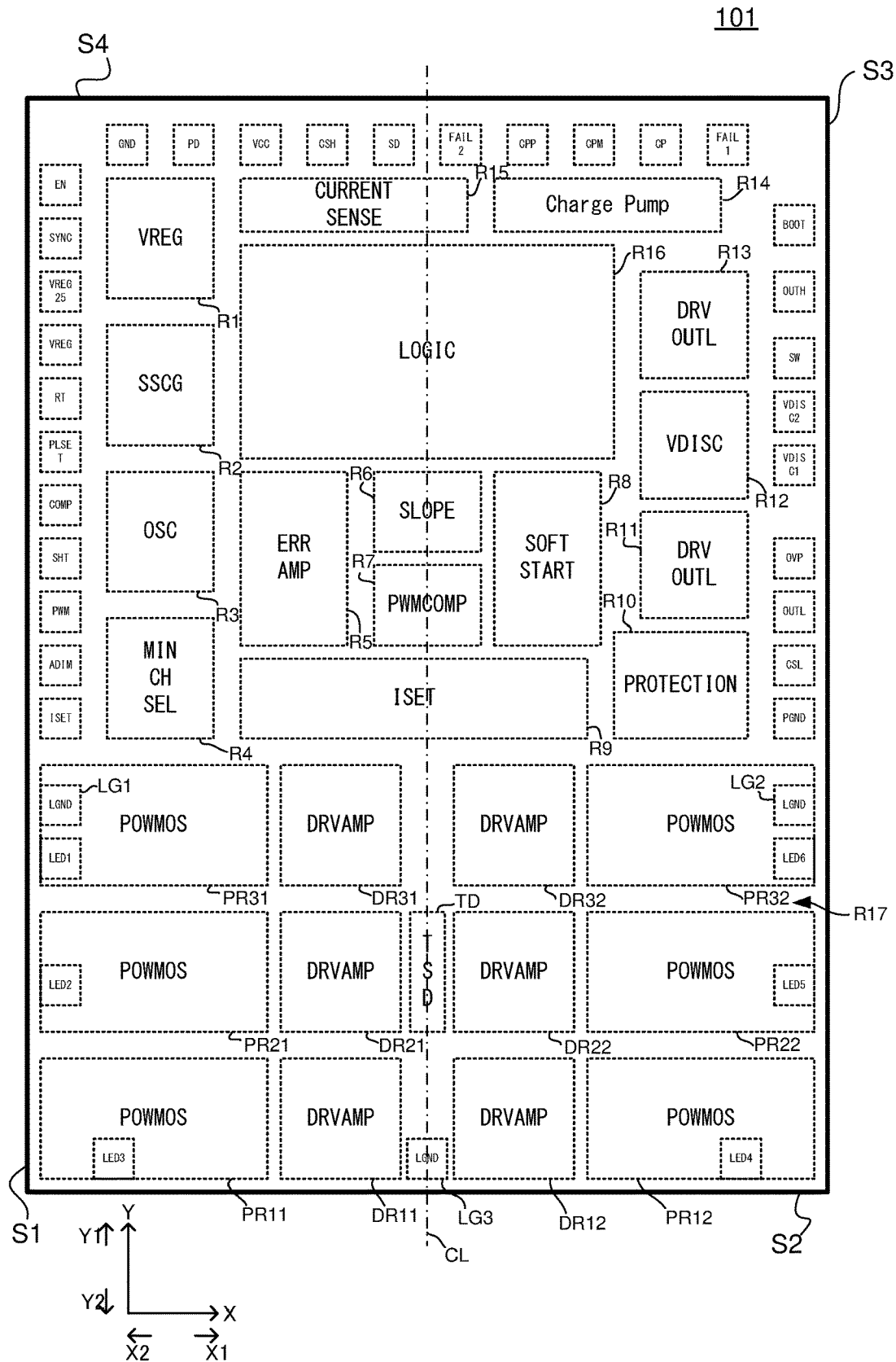
FIG. 21 A plan view showing the arrangement on a chip of electrode pads and of regions in which different circuit blocks are arranged.

FIG. 21 is a plan view showing the arrangement, on a chip 101 included in the LED driving device 312 shown in FIG. 20 described above, of electrode pads and of regions in which different circuit blocks are arranged.

In FIG. 21, the X-axis direction and the Y-axis direction perpendicular to the X-axis direction are indicated. More specifically, as the X direction, X1 and X2 directions are indicated, and as the Y-axis direction, Y1 and Y2 directions are indicated. The X2 and Y2 directions are the directions in which the axes come closer to each other.

The chip 101 shown in FIG. 21 has an outline in a rectangular shape. This rectangle has a first side S1 extending in the Y-direction on the X2-direction side, a second side S2 extending in the X-direction on the Y2-direction side, a third side S3 extending in the Y-direction on the X1-direction side, and a fourth side S4 extending in the X-direction on the Y1-direction side.

The chip 101 includes, as electrode pads, a plurality of pads such as an EN pad.

These pads are arranged so as to correspond, one-to-one, to the terminals on the IC package shown in FIG. 20.

Along the first side S1, there are arranged, an EN pad, an SYNC pad, a VREG25 pad, a VREG pad, an RT pad, a PLSET pad, a COMP pad, an SHT pad, a PWM pad, an ADIM pad, an ISET pad, an LGND pad, an LED1 pad, and an LED2 pad in this order in the Y2-direction. Along the second side S2, there are arranged, an LED3 pad, an LGND pad, and an LED4 pad in this order in the X1-direction. Along the third side S3, there are arranged, an LED5 pad, an LED6 pad, an LGND pad, a PGND pad, a CSL pad, an OUTL pad, an OVP pad, a VDISC1 pad, a VDISC2 pad, an SW pad, an OUTH pad, and a BOOT pad in this order in the Y1-direction. Along the fourth side S4, there are arranged, a FAIL1 pad, a CP pad, a CPM pad, a CPP pad, a FAIL2 pad, an SD pad, a CSH pad, a VCC pad, a PD pad, and a GND pad in this order in the X2-direction.

The chip 101 includes, as regions for arranging different circuit blocks, regions R1 to R16.

The region R1 is a region for arranging the internal voltage generator 1. The region R2 is a region for arranging the spectrum spreader 6. The region R3 is a region for arranging the oscillator 4. The region R4 is a region for arranging the selector 16. The regions R1 to R4 are arrayed in the Y2-direction near the first side S1.

The region R5 is a region for arranging the error amplifier 15. The region R6 is a region for arranging the slope generator 5. The region R7 is a region for arranging the PWM comparator 7. The region R8 is a region for arranging the soft starter 13. The region R9 is a region for arranging the LED current setter 19.

The region R5 is arranged on the X1-direction side of the region R3, opposite the region R3 in the X-direction. The region R5 is arranged on the X1-direction side of the region R4, opposite the region R4 in the X-direction. The region R6 is arranged on the X1-direction side of the region R5, opposite the region R5 in the X-direction. The region R7 is arranged on the X1-direction side of the region R5, opposite the region R5 in the X-direction. The region R7 is arranged on the Y2-direction side of the region R6. The region R8 is arranged on the X1-direction side of the regions R6 and R7, opposite the regions R6 and R7 in the X-direction. The region R9 is arranged on the Y2-direction side of the regions R5, R7, and R8.

The region R10 is a region for arranging the protection circuit 17. The region R11 is a region for arranging the low-side driver 11. The region R12 is a region for arranging the output discharger 14. The region R13 is a region for arranging the high-side driver 9. The regions R10 to R13 are arrayed in the Y1-direction near the third side S3.

The region R14 is a region for arranging the charge pump 3. The region R15 is a region for arranging the current sensor 2. The regions R14 to R15 are arrayed in the X2-direction near the fourth side S4.

The region R16 is a region for arranging the logic circuit. The region R16 is arranged so as to be surrounded by the regions R1, R2, R5, R6, R8, R12, R13, R14, and R15.

On the Y2-direction side of the regions R4, R9, and R10, a Y2-direction side end part region R17 (a predetermined region) is arranged. In the Y2-direction side end part region R17, there are arranged regions for arranging MOSFETs included in the constant current driver 18, namely PR11, PR12, PR21, PR22, PR31, and PR32, and also regions for arranging driver amplifiers included in the constant current driver 18, namely DR11, DR12, DR21, DR22, DR31, and DR32.

The regions PR31 and DR31 correspond to the LED array 41. The regions PR21 and DR21 correspond to the LED array 42. The regions PR11 and DR11 correspond to the LED array 43. The regions PR12 and DR12 correspond to the LED array 44. The regions PR22 and DR22 correspond to the LED array 45. The regions PR32 and DR32 correspond to the LED array 46.

The regions DR11 and DR12 are formed so as to be symmetrical with each other about the middle line CL that runs along the Y-axis direction of the chip 101. The regions PR11 and PR12 are formed outward of the regions DR11 and DR12, respectively, in the X-axis direction so as to be symmetrical with each other about the middle line CL mentioned above.

The group composed of the regions PR21 and PR22 and the regions DR21 and DR22 is arranged on the Y1-direction side of the group composed of the regions PR11 and PR12 and the regions DR11 and DR12. The regions DR21 and DR22 are formed so as to be symmetrical with each other about the middle line CL mentioned above. The regions PR21 and PR22 are formed outward of the regions DR21 and DR22, respectively, in the X-axis direction so as to be symmetrical with each other about the middle line CL mentioned above.

The group composed of the regions PR31 and PR32 and the regions DR31 and DR32 is arranged on the Y1-direction side of the group composed of the regions PR21 and PR22 and the regions DR21 and DR22. The regions DR31 and DR32 are formed so as to be symmetrical with each other about the middle line CL mentioned above. The regions PR31 and PR32 are formed outward of the regions DR31 and DR32, respectively, in the X-axis direction so as to be symmetrical with each other about the middle line CL mentioned above.

Such region arrangement in the Y2-direction side end part region R17 allows easy design change in a case where, for example, the number of LED channels is increased from six to eight or decreased from six to four. This means that it is easier to build a product lineup.

In the region PR31, the LGND pad LG1 and the LED1 pad are arranged. In the region PR21, the LED2 pad is arranged. In the region PR11, the LED3 pad is arranged. In the region PR12, the LED4 pad is arranged. In the region PR22, the LED5 pad is arranged. In the region PR32, the LGND pad LG2 and the LED6 pad are arranged.

The LGND pad LG3 is arranged between the regions DR11 and DR12 in the X-direction. The LED pads LG1 and LG2 are connected together by an unillustrated first line that runs in the X-direction. The first line is connected to the LGND pad LG3 by an unillustrated second line that runs in the Y-direction. For the first and second lines, thick conductors are used to reduce the impedance.

Since the regions corresponding to all the LED channels are concentrated in the Y2-direction side end part region R17, it is possible to suppress an increase in the chip size due to thick lines connected to the ground.

Arranging the LGND pads LG1 to LG3 helps reduce the impedance in each LED channel while reducing the number of pads.

As shown in FIG. 21, it is preferable that the region TD for arranging the TSD circuit be arranged in the center of the Y2-direction side end part region R17. In this way, it is possible to sense temperature at a position where there is no temperature gradient relative to the Y2-direction side end part region R17, which generates heat. However, to suppress the effects of noise by shortening the length of conductors from the TSD circuit to the logic circuit, it is preferable to arrange the region TD between the Y2-direction side end part region R17 and the region R16 for arranging the logic circuit.

<10. Application to Backlight Devices>

Figure 22:
FIG. 22 A diagram showing a configuration example of a backlight device.

As one application example of an LED driving device according to the present invention described above, a backlight device will now be described. FIG. 22 shows an example of the structure of a backlight device to which the LED driving device according to the embodiment of the present invention can be applied. Although the structure shown in FIG. 22 is of what is called an edge light type, this is not meant as any limitation; instead, a structure of a direct backlight type will do.

A backlight device 70 shown in FIG. 22 is a lighting device that illuminates a liquid crystal panel 81 from behind. The backlight device 70 includes an LED light source 71, a light guide plate 72, a reflection plate 73, and optical sheets 74. The LED light source 71 includes LEDs and a board on which the LEDs are mounted. The light emitted from the LED light source 71 enters the light guide plate 72 through a side face of it. The light guide plate 72, which is formed of, for example, an acrylic plate, guides the light that has entered it all over its inside while totally reflecting the light. The light guide plate 72 then sends forth the light in a planar form through a side face of it on which the optical sheets 74 are arranged. The reflection plate 73 reflects light that leads out of the light guide plate 72 to send it back into the light guide plate 72. The optical sheets 74 are composed of a diffuser sheet, a lens sheet, and the like, and serves to make even and improve the brightness of the light shone to the liquid crystal panel 81. The LED light source 71 includes the LED driving device according to the embodiment of the present invention, an output stage, and LEDs.

<11. Vehicle-Mounted Display>

The backlight device employing the LED driving device according to the embodiment of the present invention described above can be suitably incorporated, in particular, in vehicle-mounted displays. With the LED driving device described above, it is possible to expand the LED dimming range, and thus it is suitable for vehicle-mounted displays that need to adjust the brightness of the display according to, for example, whether the vehicle is driving during the day or during the night, or, during the day, whether the vehicle is driving in the open air or inside a tunnel.

Figure 23:
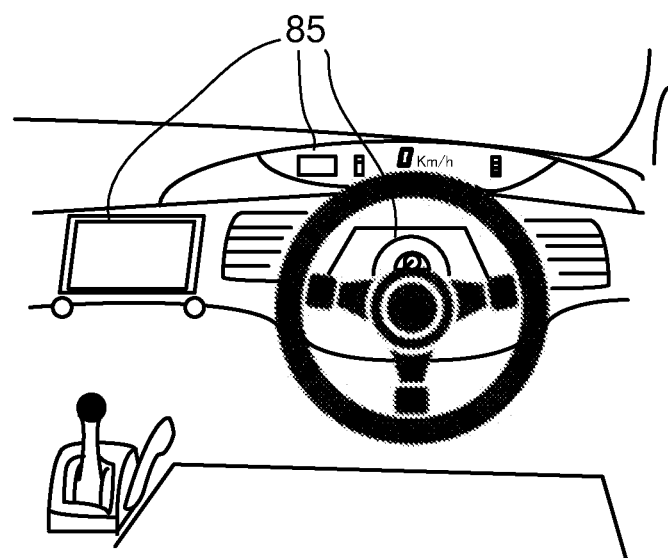
FIG. 23 A diagram showing one example of a vehicle-mounted display.

The vehicle-mounted display is provided, for example, on the dashboard in front of the driver's seat in a vehicle, like the vehicle-mounted display 85 shown in FIG. 23. The vehicle-mounted display 85 can convey different kinds of information to a user by displaying different images such as of car navigation information, a rear view from the vehicle, a speedometer, a fuel gauge, a fuel consumption meter, and shift positions. Such a vehicle-mounted display is referred to also as a cluster panel or a center information display (CID). The vehicle-mounted displays may also be used, for example, in back-seat entertainment equipment that is arranged behind the driver's seat or the passenger's seat.

<12. Others>

The above embodiments should be understood to be in every aspect illustrative and not restrictive. The technical scope of the present invention is defined not by the description of the embodiments given above but by the appended claims, and should be understood to encompass any modifications made in the sense and scope equivalent to those of the claims.

INDUSTRIAL APPLICABILITY

The present invention finds applications as means for driving, for example, vehicle-mounted LEDs.

LIST OF REFERENCE SIGNS 1 internal voltage generator
2 current sensor
3 charge pump
4 oscillator
5 slope generator
6 spectrum spreader
7 PEM comparator
8 control logic circuit
9 high-side driver
10 transistor
11 low-side driver
12 Schmitt trigger
13 soft starter
14 output discharger
15 error amplifier
16 selector
17 protection circuit
18 constant current driver
19 LED current setter
20 reference voltage source
21 Schmitt trigger
22 dimming controller
23 Schmitt trigger
30, 311, 312 LED driving device
301 DC-DC controller
35 output stage
Co output capacitor
N1, N2 switching element
D1, D2 diode L1 inductor
3121 sealed body
3122, 3123A to 3123D bottom-side heatsink pad
312A first side
312B second side
312C third side
312D fourth side
70 backlight device
71 LED light source
72 light guide plate
73 reflection plate
74 optical sheets
81 liquid crystal panel
85 vehicle-mounted display
101 chip

The invention claimed is:

1. An LED driving device comprising a chip having a first side and a second side that extend in a first direction and that are opposite from each other in a second direction perpendicular to the first direction and a third side and a fourth side that extend in the second direction and that are opposite from each other in the first direction, wherein:
the chip has a current driver that includes a driver amplifier and a transistor and that is configured to generate an output current for an LED, the chip further including:
a logic circuit arranged at a middle in the first direction;
a DC-DC controller configured to control an output stage for generating from an input voltage an output voltage to feed the output voltage to the LED; and
a plurality of main regions arranged in a row along the second direction, and each of the main regions includes a first region in which the driver amplifier is arranged and that is formed to be symmetrical about a reference line extending in the second direction, and a second region in which the transistor is arranged and that is formed to be symmetrical about the reference line, outward of the first region in the first direction,
the current driver is configured to perform PWM dimming by keeping the output current on during an LED current on period of a PWM dimming signal and keeping the output current off during an LED current off period of the PWM dimming signal,
the DC-DC controller includes:
the logic circuit;
a feedback controller configured to perform feedback control to output switching pulses to the output stage such that a cathode voltage of the LED equals a reference voltage; and
a pulse addition controller configured to perform pulse addition control to add a predetermined number of additional switching pulses at a shift between the LED current on period and the LED current off period, wherein the pulse addition controller is operable for the predetermined number to be variably set.

2. The LED driving device according to claim 1, wherein the chip further includes an overheat protection circuit that is arranged in a middle part, in the second direction, of the plurality of main regions, in a middle part, in the first direction, of at least one of the main regions.

3. The LED driving device according to claim 1, wherein the chip includes a first ground terminal and a second ground terminal provided in the second region in, of the plurality of main regions, a main region closest, in the second direction, to the logic circuit, and
the first and second ground terminals are arranged opposite from each other with respect to the reference line.

4. The LED driving device according to claim 1, wherein the current driver is configured to turn on the output current simultaneously with the LED current on period, and
the pulse addition controller is configured to add the additional switching pulses immediately after a switch from the LED current on period to the LED current off period.

5. The LED driving device according to claim 1, wherein the current driver is configured to turn on the output current simultaneously with the LED current on period, and
the pulse addition controller is configured to add the additional switching pulses immediately before a switch from the LED current off period to the LED current on period.

6. The LED driving device according to claim 1, wherein the pulse addition controller is configured to add the additional switching pulses immediately after a switch from the LED current on period to the LED current off period, and
the current driver is configured to turn on the output current with a delay corresponding to the additional switching pulses after a start of the LED current on period.

7. The LED driving device according to claim 1, further comprising a first external terminal to which a voltage resulting from dividing a first predetermined voltage with a first voltage division resistor is applicable, wherein the predetermined number is set variably according to the voltage applied to the first external terminal.

8. The LED driving device according to claim 7 further comprising an internal voltage generator configured to generate an internal voltage based on the input voltage, wherein the first predetermined voltage is the internal voltage.

9. The LED driving device according to claim 7 configured as an IC package having a sealing member, wherein the current driver includes:
a dimming controller configured to instruct the current driver,
if a set LED current ratio is equal to or higher than an LED current ratio threshold value, to perform DC dimming by keeping the output current on continuously and,
if the set LED current ratio is lower than the LED current ratio threshold value, to perform the PWM dimming;
a fourth external terminal to which a voltage resulting from dividing a third predetermined voltage with a third voltage division resistor is applicable; and
a fifth external terminal from which an internal voltage is output,
wherein
the LED current ratio threshold value is set variably according to the voltage applied to the fourth external terminal,
the third predetermined voltage is the internal voltage, and
a side of the sealing member along which the fifth external terminal is arranged is same as a side along which the first and fourth external terminals are arranged.

10. The LED driving device according to claim 1, wherein a duty of the additional switching pulses is a duty of a last one of the switching pulses during the immediately previous LED current on period.

11. The LED driving device according to claim 1, wherein the pulse addition controller is configured to perform the pulse addition control over an entire range of a PWM on-duty from a lower limit to an upper limit thereof.

12. The LED driving device according to claim 1, wherein the current driver includes a dimming controller configured to instruct the current driver,
   if a set LED current ratio is equal to or higher than an LED current ratio threshold value, to perform DC dimming by keeping the output current on continuously and,
   if the set LED current ratio is lower than the LED current ratio threshold value, to perform the PWM dimming.

13. The LED driving device according to claim 12, wherein the LED current ratio threshold value is set variably.

14. The LED driving device according to claim 13, further comprising a second external terminal to which a voltage resulting from dividing a second predetermined voltage with a second voltage division resistor is applicable, wherein the LED current ratio threshold value is set variably according to the voltage applied to the second external terminal.

15. The LED driving device according to claim 14, further comprising an internal voltage generator configured to generate an internal voltage based on the input voltage, wherein the second predetermined voltage is the internal voltage.

16. The LED driving device according to claim 12, further comprising a third external terminal, wherein the LED current ratio threshold value is set according to a duty of the PWM dimming signal fed to the third external terminal.

17. The LED driving device according to claim 1, wherein the LED includes LEDs in a plurality of channels,
   a delay time from a start timing of the LED current on period to a timing at which the output current is turned on increases from one to another of the channels, and
   the pulse addition controller is configured to add the additional switching pulses at a last timing at which the output current is turned from on to off among the plurality of channels.

* * * * *